(12) United States Patent
Gandhi et al.

(10) Patent No.: US 8,587,559 B2
(45) Date of Patent: Nov. 19, 2013

(54) MULTIPOINT NANOSTRUCTURE-FILM TOUCH SCREEN

(75) Inventors: Shripal Gandhi, Palo Alto, CA (US); David Thomas, San Carlos, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 877 days.

(21) Appl. No.: 12/211,787

(22) Filed: Sep. 16, 2008

(65) Prior Publication Data
US 2009/0085894 A1    Apr. 2, 2009

Related U.S. Application Data

(60) Provisional application No. 60/976,235, filed on Sep. 28, 2007.

(51) Int. Cl.
*G06F 3/042* (2006.01)

(52) U.S. Cl.
USPC .................. 345/175; 345/173; 178/18.01

(58) Field of Classification Search
USPC .............. 345/173–178; 178/18.01–18.08
See application file for complete search history.

(56) References Cited

U.S. PATENT DOCUMENTS

| | | | |
|---|---|---|---|
| 5,381,160 A * | 1/1995 | Landmeier | 345/174 |
| 7,796,123 B1 * | 9/2010 | Irvin et al. | 345/173 |
| 2004/0135773 A1 * | 7/2004 | Bang et al. | 345/173 |
| 2005/0174335 A1 * | 8/2005 | Kent et al. | 345/173 |
| 2005/0215731 A1 * | 9/2005 | Furumi et al. | 525/540 |
| 2005/0219788 A1 * | 10/2005 | Chow et al. | 361/305 |
| 2005/0270272 A1 * | 12/2005 | Shi | 345/173 |
| 2006/0097991 A1 | 5/2006 | Hotelling et al. | |
| 2006/0266640 A1 * | 11/2006 | Halsey et al. | 204/192.29 |
| 2006/0274049 A1 * | 12/2006 | Spath et al. | 345/173 |
| 2007/0074316 A1 * | 3/2007 | Alden et al. | 977/762 |
| 2007/0120095 A1 * | 5/2007 | Gruner | 252/500 |
| 2007/0176538 A1 * | 8/2007 | Winters et al. | 313/504 |
| 2007/0243652 A1 * | 10/2007 | Bour et al. | 438/46 |
| 2008/0192014 A1 * | 8/2008 | Kent et al. | 345/173 |

* cited by examiner

*Primary Examiner* — Amare Mengistu
*Assistant Examiner* — Premal Patel
(74) *Attorney, Agent, or Firm* — Harness, Dickey & Pierce, P.L.C.

(57) ABSTRACT

A touch screen comprising at least one nanostructure film and capable of detecting multiple touches occurring at the same time at distinct locations in a plane of the touch screen is described. The touch screen may comprise a sensing layer, a driving layer and/or a shielding layer. At least one of these layers may comprise a nanostructure film, and at least two of these layers may be formed on a common substrate.

14 Claims, 15 Drawing Sheets

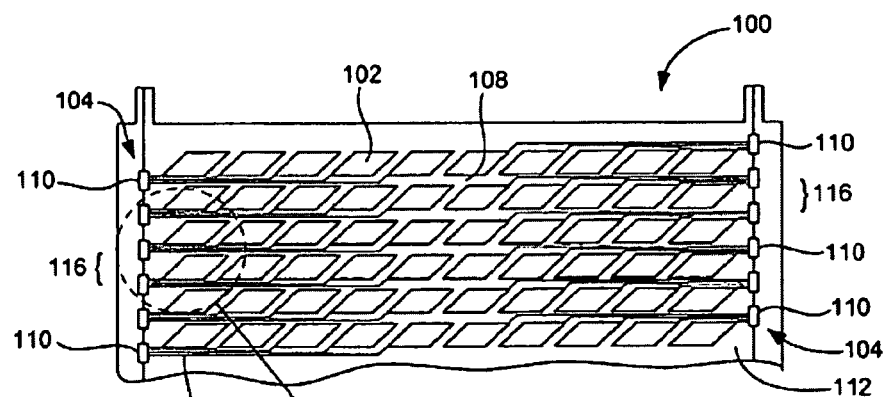
FIG. 6A
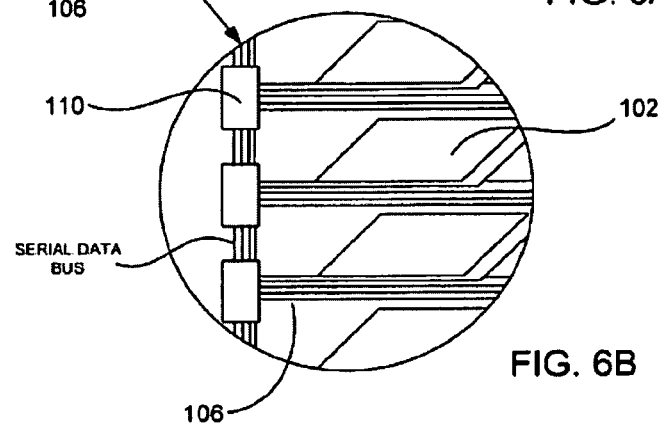
FIG. 6B
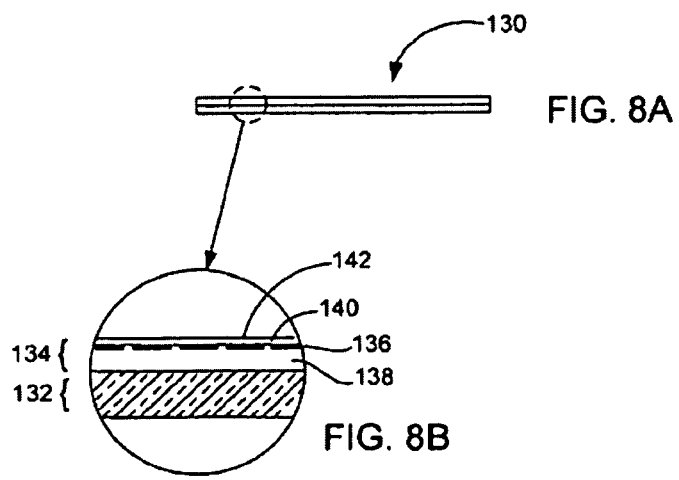
FIG. 8A
FIG. 8B

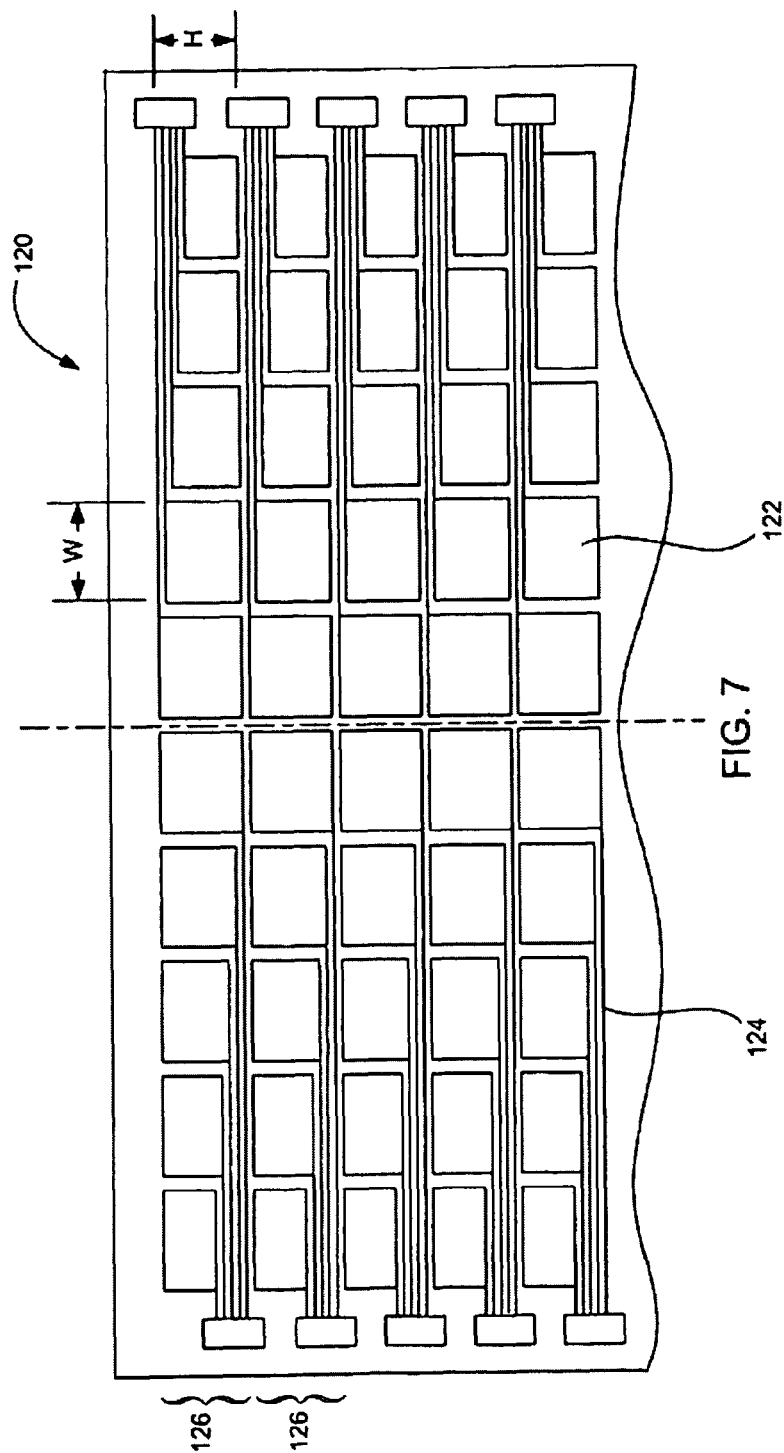

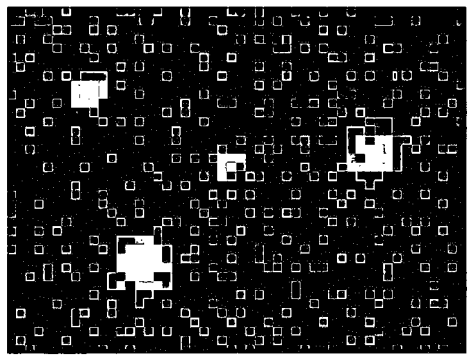
FIG. 17A
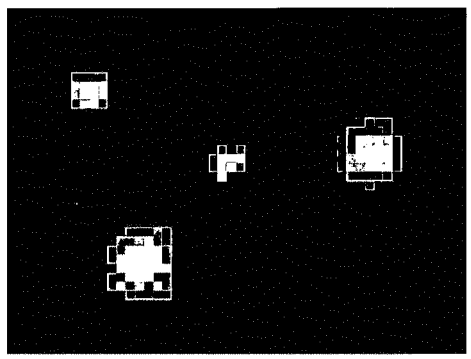
FIG. 17B
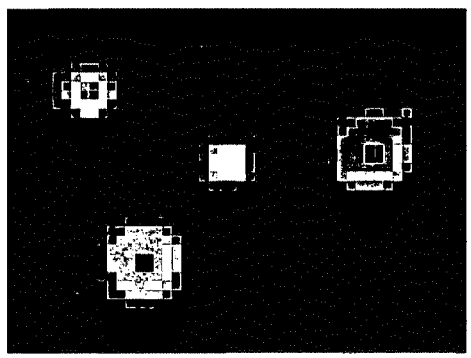
FIG. 17C
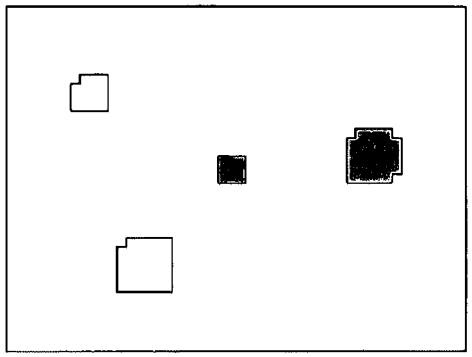
FIG. 17D
FIG. 17E

MULTIPOINT NANOSTRUCTURE-FILM TOUCH SCREEN

This application claims priority to U.S. Provisional Application No. 60/976,235, filed Sep. 28, 2007 and entitled "MULTIPOINT NANOSTRUCTURE-FILM TOUCH SCREEN," the entire contents of which are hereby incorporated herein by reference.

FIELD OF THE INVENTION

The present invention relates generally to an electronic device having a touch screen comprising at least one nanostructure film. More particularly, the present invention relates to a nanotube-film touch screen capable of sensing multiple points at the same time.

BACKGROUND OF THE INVENTION

Many modern and/or emerging applications require at least one device electrode that has not only high electrical conductivity, but high optical transparency as well. Such applications include, but are not limited to, touch screens (e.g., analog, resistive, 4-wire resistive, 5-wire resistive, surface capacitive, projected capacitive, multi-touch, etc.), displays (e.g., flexible, rigid, electro-phoretic, electro-luminescent, electrochromatic, liquid crystal (LCD), plasma (PDP), organic light emitting diode (OLED), etc.), solar cells (e.g., silicon (amorphous, protocrystalline, nanocrystalline), cadmium telluride (CdTe), copper indium gallium selenide (CIGS), copper indium selenide (CIS), gallium arsenide (GaAs), light absorbing dyes, quantum dots, organic semiconductors (e.g., polymers, small-molecule compounds)), solid state lighting, fiber-optic communications (e.g., electro-optic and opto-electric modulators) and microfluidics (e.g., electrowetting on dielectric (EWOD)).

As used herein, a layer of material or a sequence of several layers of different materials is said to be "transparent" when the layer or layers permit at least 50% of the ambient electromagnetic radiation in relevant wavelengths to be transmitted through the layer or layers. Similarly, layers which permit some but less than 50% transmission of ambient electromagnetic radiation in relevant wavelengths are said to be "semi-transparent."

Currently, the most common transparent electrodes are transparent conducting oxides (TCOs), specifically indium-tin-oxide (ITO) on glass. However, ITO can be an inadequate solution for many of the above-mentioned applications (e.g., due to its relatively brittle nature, correspondingly inferior flexibility and abrasion resistance), and the indium component of ITO is rapidly becoming a scarce commodity. Additionally, ITO deposition usually requires expensive, high-temperature sputtering, which can be incompatible with many device process flows. Hence, more robust, abundant and easily-deposited transparent conductor materials are being explored.

Touch screens are display overlays which may be pressure sensitive (resistive), electrically-sensitive (capacitive), acoustically-sensitive (surface acoustic wave (SAW)) and/or photo-sensitive (infra-red). The effect of such overlays is to allow a display to be used as an input device, with such displays often attached to computers and/or networks. Touch screens typically include a touch panel, a controller and a software driver. The touch panel is a transparent panel with a touch-sensitive surface, which registers touch events and sends these signals to the controller. The controller processes these signals and sends the data to the computers and/or networks, wherein the software driver translates the touch events into computer events.

One problem found in conventional touch screen technologies is that many are only capable of reporting a single point even when multiple objects are placed on the sensing surface. That is, they lack the ability to track multiple points of contact simultaneously. In resistive and capacitive technologies, an average of all simultaneously occurring touch points are determined and a single point which falls somewhere between the touch points is reported. In surface wave and infrared technologies, it is difficult, if not impossible, to discern the exact position of multiple touch points that fall on the same horizontal or vertical lines due to masking. In either case, faulty results are generated.

A related problem found in many conventional touch screen technologies is that they utilize transparent conductive materials that are ill-suited for touch panel functionality. For example, ITO can be an inadequate touch panel solution, given that ITO is relatively brittle and consequently prone to mechanical degradation, in which case faulty results are generated. Additionally, currently-available ITO deposition methods can be limiting in terms of the possible touch screen device architectures enabled thereby.

SUMMARY OF THE INVENTION

The present invention describes nanostructure films. Nanostructures have attracted a great deal of recent attention due to their exceptional material properties. Nanostructures may include, but are not limited to, nanotubes (e.g., single-walled carbon nanotubes (SWNTs), multi-walled carbon nanotubes (MWNTs), double-walled carbon nanotubes (DWNTs), few-walled carbon nanotubes (FWNTs)), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2$, $TiO_2$), organic, inorganic). Nanostructure films may comprise at least one interconnected network of such nanostructures, and may similarly exhibit exceptional material properties. For example, nanostructure films comprising at least one interconnected network of substantially carbon nanotubes (e.g., wherein nanostructure density is above a percolation threshold) can exhibit extraordinary strength and electrical conductivity, as well as efficient heat conduction and substantial optical transparency. As used herein, "substantially" shall mean that at least 40% of components are of a given type.

In one embodiment, the invention relates to a nanostructure-film touch screen comprising at least one nanostructure-film electrode configured to detect multiple touches or near touches that occur at the same time and at distinct locations in the plane of the touch panel, and to produce distinct signals representative of the location of the touches on the plane of the touch panel for each of the multiple touches. Nanostructure films according to embodiments of the present invention include, but are not limited to, those comprising networks of nanotubes, nanowires, nanoparticles and/or graphene flakes. Such nanostructure films can be transparent, conductive, and substantially more mechanically robust than ITO.

In one embodiment, the nanostructure-film touch screen comprises at least two nanostructure films (e.g., at least two of a sensing layer, a driving layer and a shielding layer) are formed on a common substrate. Said nanostructure films may be formed on the same side of the common substrate, or on opposite sides of the substrate. Such nanostructure films may be electrically separated by a dielectric layer (e.g., the common substrate, a dielectric layer coated over a nanostructure film, etc.).

In one embodiment, the invention relates to a display arrangement wherein the touch screen is a substantially transparent panel that is positioned in front of a screen for displaying a graphical user interface, such that the screen can be viewed through the panel.

In one embodiment, the invention relates to a computer system comprising a processor operatively coupled to the display arrangement, and configured to execute instructions and carry out operations associated with the computer system.

In one embodiment, the invention relates to a computer-implemented method, comprising receiving multiple touches on the surface of a nanostructure-film touch screen at the same time, separately recognizing each of the multiple touches and reporting touch data based on the recognized multiple touches.

In one embodiment, the invention relates to a touch screen method comprising driving a plurality of sensing points, reading the outputs from all the sensing lines connected to the sensing points, producing and analyzing an image of a nanostructure-film touch screen plane at one moment in time in order to determine where objects are touching the nanostructure-film touch screen. The method additionally includes comparing the current image to a past image in order to determine a change at the objects touching the touch screen.

In one embodiment, the invention relates to a digital signal processing method, comprising receiving raw data that includes values for each transparent capacitive sensing node of a nanostructure-film touch screen, filtering the raw data, generating gradient data, calculating the boundaries for touch regions base on the gradient data, and calculating the coordinates for each touch region.

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed; the present invention may be employed in not only transparent conductive film applications, but in other nanostructure applications as well (e.g., nontransparent electrodes, transistors, diodes, conductive composites, electrostatic shielding, etc.).

BRIEF DESCRIPTION OF THE DRAWINGS

The invention is better understood from reading the following detailed description of the preferred embodiments, with reference to the accompanying figures in which:

FIG. 6 is a partial top view of a transparent multiple point nanostructure-film touch screen, in accordance with one embodiment of the present invention;

FIG. 7 is a partial top view of a transparent multi point nanostructure-film touch screen, in accordance with one embodiment of the present invention;

FIG. 8 is a front elevation view, in cross section of a display arrangement, in accordance with one embodiment of the present invention;

FIGS. 17A-E show touch data at several steps, in accordance with one embodiment of the present invention;

Features, elements, and aspects of the invention that are referenced by the same numerals in different figures represent the same, equivalent, or similar features, elements, or aspects in accordance with one or more embodiments of the system.

DETAILED DESCRIPTION OF THE EMBODIMENTS

Figure 1A:
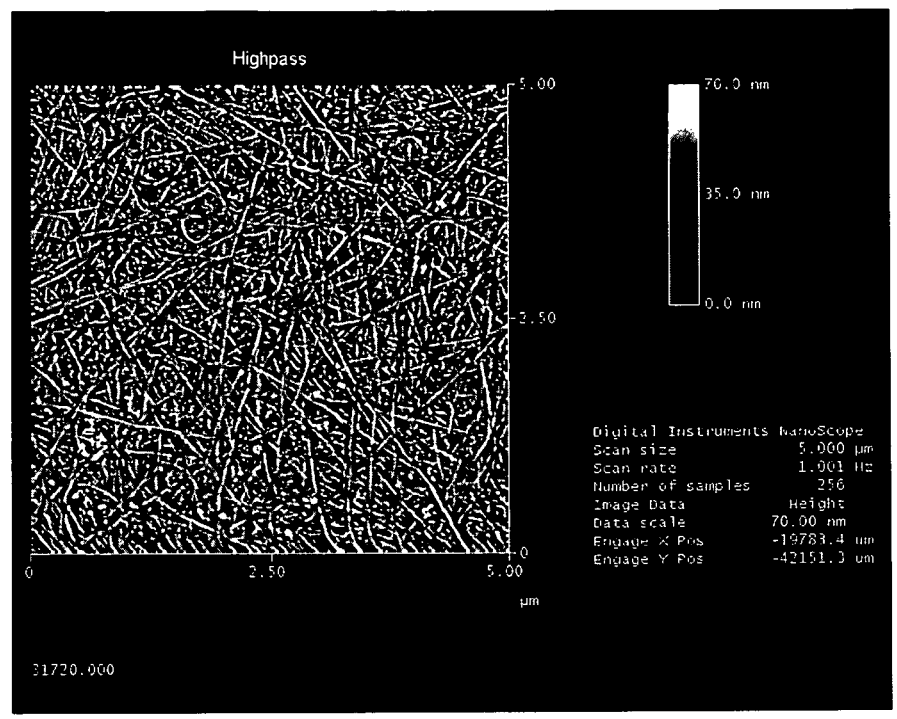
FIG. 1 is a scanning electron microscope (SEM) image of a nanostructure film according to one embodiment of the present invention.
Figure 1B:
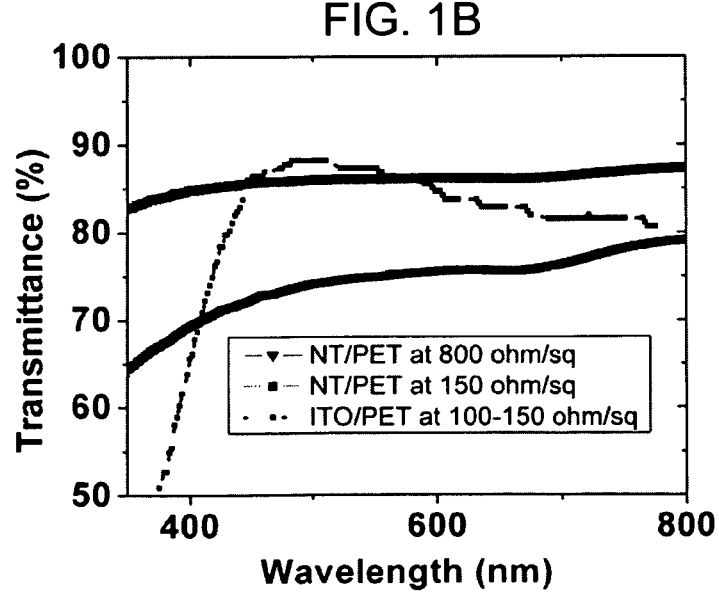

Referring to FIG. 1, a nanostructure film according to one embodiment of the present invention comprises at least one interconnected network of single-walled carbon nanotubes (SWNTs). Such film may additionally or alternatively comprise other nanotubes (e.g., MWNTs, DWNTs), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2$, $TiO_2$), organic, inorganic).

Such nanostructure film may further comprise at least one functionalization material bonded to the nanostructure film. For example, a dopant bonded to the nanostructure film may increases the electrical conductivity of the film by increasing carrier concentration. Such dopant may comprise at least one of Iodine ($I_2$), Bromine ($Br_2$), polymer-supported Bromine ($Br_2$), Antimonypentafluride ($SbF_5$), Phosphoruspentachloride ($PCl_5$), Vanadiumoxytrifluride ($VOF_3$), Silver(II) Fluoride ($AgF_2$), 2,1,3-Benzoxadiazole-5-carboxylic acid, 2-(4-Biphenylyl)-5-phenyl-1,3,4-oxadiazole, 2,5-Bis-(4-aminophenyl)-1,3,4-oxadiazole, 2-(4-Bromophenyl)-5-phenyl-1,3,4-oxadiazole, 4-Chloro-7-chlorosulfonyl-2,1,3-benzoxadiazole, 2,5-Diphenyl-1,3,4-oxadiazole, 5-(4-

Methoxyphenyl)-1,3,4-oxadiazole-2-thiol, 5-(4-Methylphenyl)-1,3,4-oxadiazole-2-thiol, 5-Phenyl-1,3,4-oxadiazole-2-thiol, 5-(4-Pyridyl)-1,3,4-oxadiazole-2-thiol, Methyl viologen dichloride hydrate, Fullerene-C60, N-Methylfulleropyrrolidine, N,N'-Bis(3-methylphenyl)-N,N'-diphenylbenzidine, Triethylamine (TEA), Triethanolanime (TEA)-OH, Trioctylamine, Triphenylphosphine, Trioctylphosphine, Triethylphosphine, Trinapthylphosphine, Tetradimethylaminoethene, Tris(diethylamino)phosphine, Pentacene, Tetracene, N,N'-Di-[(1-naphthyl)-N,N'-diphenyl]-1,1'-biphenyl)-4,4'-diamine sublimed grade, 4-(Diphenylamino)benzaldehyde, Di-p-tolylamine, 3-Methyldiphenylamine, Triphenylamine, Tris[4-(diethylamino)phenyl]amine, Tri-p-tolylamine, Acradine Orange base, 3,8-Diamino-6-phenylphenanthridine, 4-(Diphenylamino) benzaldehyde diphenylhydrazone, Poly(9-vinylcarbazole), Poly(1-vinylnaphthalene), Poly(2-vinylpyridine)n-oxide, Triphenylphosphine, 4-Carboxybutyl)triphenylphosphonium bromide, Tetrabutylammonium benzoate, Tetrabutylammonium hydroxide 30-hydrate, Tetrabutylammonium triiodide, Tetrabutylammonium bis-trifluoromethanesulfonimidate, Tetraethylammonium trifluoromethanesulfonate, Oleum ($H_2SO_4$—$SO_3$), Triflic acid and/or Magic Acid.

Such dopant may be bonded covalently or noncovalently to the film. Moreover, the dopant may be bonded directly to the film or indirectly through and/or in conjunction with another molecule, such as a stabilizer that reduces desorption of dopant from the film. The stabilizer may be a relatively weak reducer (electron donor) or oxidizer (electron acceptor), where the dopant is a relatively strong reducer (electron donor) or oxidizer (electron acceptor) (i.e., the dopant has a greater doping potential than the stabilizer). Additionally or alternatively, the stabilizer and dopant may comprise a Lewis base and Lewis acid, respectively, or a Lewis acid and Lewis base, respectively. Exemplary stabilizers include, but are not limited to, aromatic amines, other aromatic compounds, other amines, imines, trizenes, boranes, other boron-containing compounds and polymers of the preceding compounds. Specifically, poly(4-vinylpyridine) and/or tri-phenyl amine have displayed substantial stabilizing behavior in accelerated atmospheric testing (e.g., 1000 hours at 65° C. and 90% relative humidity).

Stabilization of a dopant bonded to a nanostructure film may also or alternatively be enhanced through use of an encapsulant. The stability of a non-functionalized or otherwise functionalized nanostructure film may also be enhanced through use of an encapsulant. Accordingly, yet another embodiment of the present invention comprises a nanostructure film coated with at least one encapsulation layer. This encapsulation layer preferably provides increased stability and environmental (e.g., heat, humidity and/or atmospheric gases) resistance. Multiple encapsulation layers (e.g., having different compositions) may be advantageous in tailoring encapsulant properties. Exemplary encapsulants comprise at least one of a fluoropolymer, acrylic, silane, polyimide and/or polyester encapsulant (e.g., PVDF (Hylar CN, Solvay), Teflon AF, Polyvinyl fluoride (PVF), Polychlorotrifluoroethylene (PCTFE), Polyvinylalkyl vinyl ether, Fluoropolymer dispersion from Dupont (TE 7224), Melamine/Acrylic blends, conformal acrylic coating dispersion, etc.). Encapsulants may additionally or alternatively comprise UV and/or heat cross-linkable polymers (e.g., Poly(4-vinyl-phenol)).

Electronic performance of a nanostructure film according to one embodiment may additionally or alternatively be enhanced by bonding metal (e.g., gold, silver) nanoparticles to nanotubes (e.g., using electro and/or electroless plating). Such bonding may be performed before, during and/or after the nanotubes have formed an interconnected network.

A nanostructure film according to one embodiment may additionally or alternatively comprise application-specific additives. For example, thin nanotube films can be inherently transparent to infrared radiation, thus it may be advantageous to add an infrared (IR) absorber thereto to change this material property (e.g., for window shielding applications). Exemplary IR absorbers include, but are not limited to, at least one of a cyanine, quinone, metal complex, and photochronic. Similarly, UV absorbers may be employed to limit the nanostructure film's level of direct UV exposure.

A nanostructure film according to one embodiment may be fabricated using solution-based processes. In such processes, nanostructures may be initially dispersed in a solution with a solvent and dispersion agent. Exemplary solvents include, but are not limited to, deionized (DI) water, alcohols and/or benzo-solvents (e.g., tolulene, xylene). Exemplary dispersion agents include, but are not limited to, surfactants and biopolymers (e.g., carboxymethylcellulose (CMC)). Applicable surfactants may be non-ionic (e.g., Triton-X, alcohols, N,N-Dimethyl-N-[3-(sulfooxy)propyl]-1-nonanaminium hydroxide inner salt, N,N-Dimethyl-N-[3-(sulfooxy)propyl]-1-decanaminium hydroxide inner salt, Glycocholic acid hydrate, Chenodeoxycholic acid diacetate methyl ester, N-Nonanoyl-N-methylglucamine, Tetrabutylammonium nitrate, 3-(Decyldimethylammonio)-propane-sulfonate inner salt, 3-(N,N-Dimethyloctylammonio)propanesulfonate inner salt, EMPIGEN® BB detergent, 1-Dodecyl-2-pyrrolidinone), cationic (e.g., thonzonium bromide, cetyl trimethylammonium bromide (CTAB), benzyltrimethylammonium bromide (BTAB), behentrimonium chloride (BTAC), dodecyltrimethylammonium chloride surfactant (DTAC)), anionic (e.g., sodium dodecyl sulfate (SDS), sodium 1-decanesulfonate, sodium 1-dodecanesulfonate, sodium dodecylbenzenesulfonate (SDBS), sodium 1-heptanesulfonate) or Zwitterionic (e.g., Dodecyl betaine, Dodecyl dimethylamine oxide, Cocamidopropyl betaine, Coco ampho glycinate). It may be advantageous to employ a multiple-surfactant system, for example, mixtures of cationic and anionic surfactants or mixtures of nonionic and anionic surfactants. Dispersion may be further aided by mechanical agitation, such as by cavitation (e.g., using probe and/or bath sonicators), shear (e.g., using a high-shear mixer and/or rotor-stator), impingement (e.g., rotor-stator) and/or homogenization (e.g., using a homogenizer). Coating aids may also be employed in the solution to attain desired coating parameters, e.g., wetting and adhesion to a given substrate; additionally or alternatively, coating aids may be applied to the substrate. Exemplary coating aids include, but are not limited to, aerosol OT, fluorinated surfactants (e.g., Zonyl FS300, FS500, FS62A), alcohols (e.g., hexanol, heptanol, octanol, nonanol, decanol, undecanol, dodecanol, saponin, ethanol, propanol, butanol and/or pentanol), aliphatic amines (e.g., primary, secondary (e.g., dodecylamine), tertiary (e.g., triethanolamine), quartinary), TX-100, FT248, Tergitol TMN-10, Olin 10G and/or APG325.

The resulting dispersion may be coated onto a substrate using a variety of coating methods. Coating may entail a single or multiple passes, depending on the dispersion properties, substrate properties and/or desired nanostructure film properties. Exemplary coating methods include, but are not limited to, spray-coating, dip-coating, drop-coating and/or casting, roll-coating, transfer-stamping, slot-die coating, curtain coating, [micro]gravure printing, flexoprinting and/or inkjet printing. Exemplary substrates may be flexible or rigid, and include, but are not limited to, glass, elastomers (e.g., saturated rubbers, unsaturated rubbers, thermoplastic elastomers (TPE), thermoplastic vulcanizates (TPV), polyurethane rubber, polysulfide rubber, resilin and/or elastin) and/or plastics (e.g., polymethyl methacrylate (PMMA), polyolefin(s), polyethylene terephthalate (PET), polyethylene naphthalate (PEN), polycarbonate (PC), polyethersulfone (PES) and/or Arton). Flexible substrates may be advantageous in having compatibility with roll-to-roll (a.k.a. reel-to-reel) processing, wherein one roll supports uncoated substrate while another roll supports coated substrate. As compared to a batch process, which handles only one component at a time, a roll-to-roll process represents a dramatic deviation from current manufacturing practices, and can reduce capital equipment and product costs, while significantly increasing throughput. Nanostructure films may be printed first on a flexible substrate, e.g., to take advantage of roll-to-roll capabilities, and subsequently transferred to a rigid substrate (e.g., where the flexible substrate comprises a release liner, laminate and/or other donor substrate or adhesion layer (e.g., A-187, AZ28, XAMA, PVP, CX-100, PU)). Substrate(s) may be pre-treated to improve adhesion of the nanotubes thereto (e.g., by first coating an adhesion layer/promoter onto the substrate).

Once coated onto a substrate, the dispersion may be heated to remove solvent therefrom, such that a nanostructure film is formed on the substrate. Exemplary heating devices include a hot plate, heating rod, heating coil and/or oven. The resulting film may be washed (e.g., with water, ethanol and/or IPA) and/or oxidized (e.g., baked and/or rinsed with an oxidizer such as nitric acid, sulfuric acid and/or hydrochloric acid) to remove residual dispersion agent and/or coating aid therefrom.

Dopant, other additives and/or encapsulant may further be added to the film. Such materials may be applied to the nanostructures in the film before, during and/or after film formation, and may, depending on the specific material, be applied in gas, solid and/or liquid phase (e.g., gas phase $NO_2$ or liquid phase nitric acid ($HNO_3$) dopants). Such materials may moreover be applied through controlled techniques, such as the coating techniques enumerated above in the case of liquid phase materials (e.g., slot-die coating a polymer encapsulant).

A nanostructure film according to one embodiment may be patterned before (e.g., using lift-off methods, pattern-pretreated substrate), during (e.g., patterned transfer printing, screen printing (e.g., using acid-paste as an etchant, with a subsequent water-wash), inkjet printing) and/or after (e.g., using laser ablation or masking/etching techniques) fabrication on a substrate. Patterning may be effected by not only selective removal or coating of nanostructures, but additionally or alternatively by changing the material properties of the film (e.g., selectively rendering nanotubes non-conductive by exposing such nanotubes to electromagnetic radiation).

In one exemplary embodiment, an optically transparent and electrically conductive nanostructure film comprising an interconnected network of SWNTs was fabricated on a transparent and flexible plastic substrate via a multi-step spray and wash process. A SWNT dispersion was initially formulated by dissolving commercially-available SWNT powder (e.g., P3 from Carbon Solutions) in DI water with 1% SDS, and probe sonicated for 30 minutes at 300 W power. The resulting dispersion was then centrifuged at 10k rcf (relative centrifugal field) for 1 hour, to remove large agglomerations of SWNTs and impurities (e.g., amorphous carbon and/or residual catalyst particles). In parallel, a PC substrate was immersed in a silane solution (a coating aid comprising 1% weight of 3-aminopropyltriethoxysilane in DI water) for approximately five minutes, followed by rinsing with DI water and blow drying with nitrogen. The resulting pre-treated PC substrate (Tekra 0.03" thick with hard coating) was then spray-coated with the previously-prepared SWNT dispersion, immersed in DI water for 1 minute, then sprayed again, and immersed in DI water again. This process of spraying and immersing in water may be repeated multiple times until a desired sheet resistance (e.g., film thickness) is achieved.

In a related exemplary embodiment, a doped nanostructure film comprising an interconnected network of SWNTs was fabricated on a transparent and flexible substrate using the methods described in the previous example, but with a SWNT dispersion additionally containing a $TCNQF_4$ dopant. In another related embodiment, this doped nanostructure film was subsequently encapsulated by spin-coating a layer of parylene thereon and baking.

In another exemplary embodiment, a SWNT dispersion was first prepared by dissolving SWNT powder (e.g., P3 from Carbon Solutions) in DI water with 1% SDS and bath-sonicated for 16 hours at 100 W, then centrifuged at 15000 rcf for 30 minutes such that only the top ¾ portion of the centrifuged dispersion is selected for further processing. The resulting dispersion was then vacuum filtered through an alumina filter with a pore size of 0.1-0.2 μm (Watman Inc.), such that an optically transparent and electrically conductive SWNT film is formed on the filter. DI water was subsequently vacuum filtered through the film for several minutes to remove SDS. The resulting film was then transferred to a PET substrate by a PDMS (poly-dimethylsiloxane) based transfer printing technique, wherein a patterned PDMS stamp is first placed in conformal contact with the film on the filter such that a patterned film is transferred from the filter to the stamp, and then placed in conformal contact with the PET substrate and heated to 80° C. such that the patterned film is transferred to the PET. In a related exemplary embodiment, this patterned film may be subsequently doped via immersion in a gaseous $NO_2$ chamber. In another related exemplary embodiment, the film may be encapsulated by a layer of PMPV, which, in the case of a doped film, can reduce desorption of dopant from the film.

In yet another exemplary embodiment, an optically transparent, electrically conductive, doped and encapsulated nanostructure film comprising an interconnected network of FWNTs was fabricated on a transparent and flexible substrate. CVD-grown FWNTs (OE grade from Unidym, Inc.) were first dissolved in DI water with 0.5% Triton-X, and probe sonicated for one hour at 300 W power. The resulting dispersion was then slot-die coated onto a PET substrate, and baked at about 100° C. to evaporate the solvent. The Triton-X was subsequently removed from the resulting FWNT film by immersing the film for about 15-20 seconds in nitric acid (10 molar). Nitric acid may be effective as both an oxidizing agent for surfactant removal, and a doping agent as well, improving the sheet resistance of the film from 498 ohms/sq to about 131 ohms/sq at about 75% transparency, and 920 ohms/sq to about 230 ohms/sq at 80% transparency in exemplary films. In related exemplary embodiments, these films were subsequently coated with triphenylamine which stabilized the dopant (i.e., the film exhibited a less than 10% change in conductivity after 1000 hours under accelerated aging conditions (65° C.)). In other related exemplary embodiments, the films were then encapsulated with Teflon AF.

In another exemplary embodiment, FWNT powder was initially dispersed in water with SDS (e.g., 1%) surfactant by sonication (e.g., bath sonication for 30 minutes, followed by probe sonication for 30 minutes); 1-dodecanol (e.g., 0.4%) was subsequently added to the dispersion by sonication (e.g., probe sonication for 5 minutes) as a coating aid, and the resulting dispersion was Meyer rod coated onto a PEN substrate. SDS was then removed by rinsing the film with DI water, and the 1-dodecanol was removed by rinsing with ethanol. This resulting optically transparent and electrically conductive films passed an industry-standard "tape test," (i.e., the FWNT film remained on the substrate when a piece of Scotch tape was pressed onto and then peeled off of the film); such adhesion between the FWNT film and PEN was not achieved with SDS dispersions absent use of a coating aid.

In one embodiment nanostructure films (e.g., as described above) may be incorporated into device as transparent electrodes.

Figure 2:
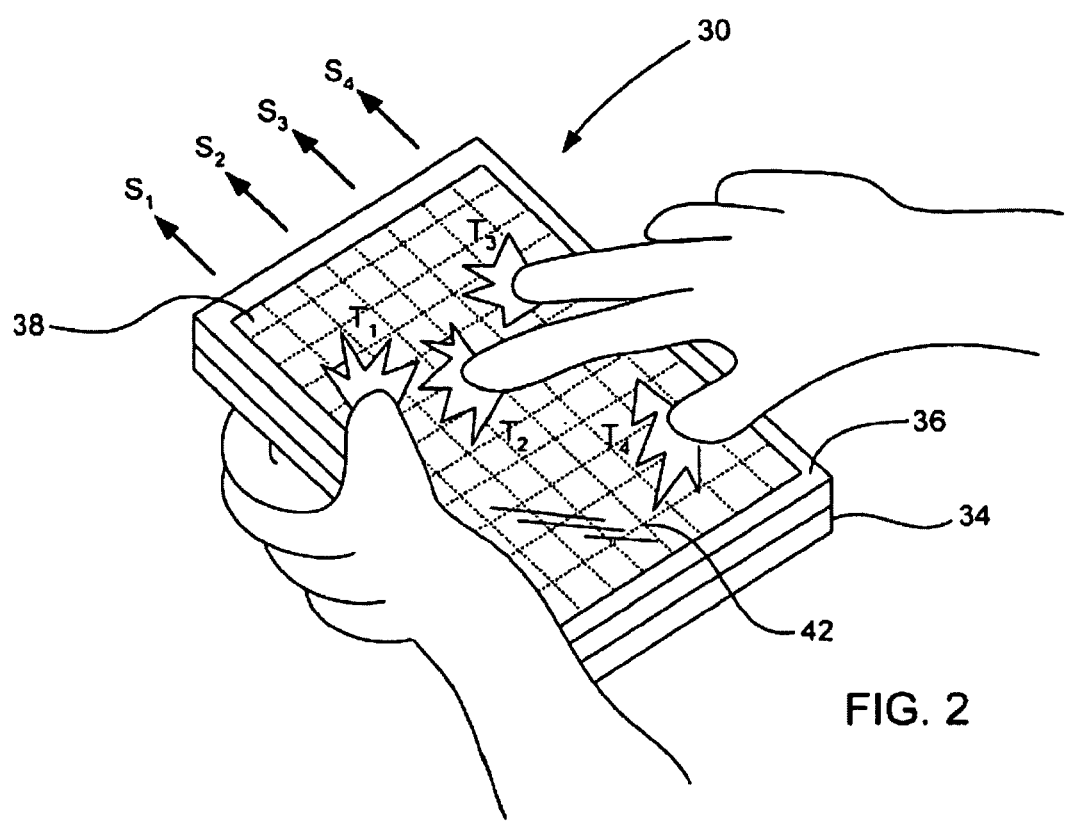
FIG. 2 is a perspective view of a display arrangement, in accordance with one embodiment of the present invention.

FIG. 2 is a perspective view of a display arrangement 30, in accordance with one embodiment of the present invention. The display arrangement 30 includes a display 34 and a transparent nanostructure-film touch screen 36 positioned in front of the display 34. The display 34 is configured to display a graphical user interface (GUI) including perhaps a pointer or cursor as well as other information to the user. The transparent nanostructure-film touch screen 36, on the other hand, is an input device that is sensitive to a user's touch, allowing a user to interact with the graphical user interface on the display 34. By way of example, the nanostructure-film touch screen 36 may allow a user to move an input pointer or make selections on the graphical user interface by simply pointing at the GUI on the display 34.

In general, nanostructure-film touch screens 36 recognize a touch event on the surface 38 of the nanostructure-film touch screen 36 and thereafter output this information to a host device. The host device may for example correspond to a computer such as a desktop, laptop, handheld or tablet computer. The host device interprets the touch event and thereafter performs an action based on the touch event. Conventionally, touch screens have only been capable of recognizing a single touch event even when the touch screen is touched at multiple points at the same time (e.g., averaging, masking, etc.). Unlike conventional touch screens, however, the nanostructure-film touch screen 36 shown herein is configured to recognize multiple touch events that occur at different locations on the touch sensitive surface 38 of the nanostructure-film touch screen 36 at the same time. That is, the nanostructure-film touch screen 36 allows for multiple contact points T1-T4 to be tracked simultaneously, i.e., if four objects are touching the nanostructure-film touch screen, then the nanostructure-film touch screen tracks all four objects. As shown, the nanostructure-film touch screen 36 generates separate tracking signals S1-S4 for each touch point T1-T4 that occurs on the surface of the nanostructure-film touch screen 36 at the same time. The number of recognizable touches may be about 15. 15 touch points allows for all 10 fingers, two palms and 3 others.

The multiple touch events can be used separately or together to perform singular or multiple actions in the host device. When used separately, a first touch event may be used to perform a first action while a second touch event may be used to perform a second action that is different than the first action. The actions may for example include moving an object such as a cursor or pointer, scrolling or panning, adjusting control settings, opening a file or document, viewing a menu, making a selection, executing instructions, operating a peripheral device connected to the host device etc. When used together, first and second touch events may be used for performing one particular action. The particular action may for example include logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Recognizing multiple touch events is generally accomplished with a multipoint sensing arrangement. The multipoint sensing arrangement is capable of simultaneously detecting and monitoring touches and the magnitude of those touches at distinct points across the touch sensitive surface 38 of the nanostructure-film touch screen 36. The multipoint sensing arrangement generally provides a plurality of transparent sensor coordinates or nodes 42 that work independent of one another and that represent different points on the nanostructure-film nanostructure-film touch screen 36. When plural objects are pressed against the nanostructure-film touch screen 36, one or more sensor coordinates are activated for each touch point as for example touch points T1-T4. The sensor coordinates 42 associated with each touch point T1-T4 produce the tracking signals S1-S4.

In one embodiment, the nanostructure-film touch screen 36 includes a plurality of capacitance sensing nodes 42. The capacitive sensing nodes may be widely varied. For example, the capacitive sensing nodes may be based on self capacitance or mutual capacitance. In self capacitance, the "self" capacitance of a single electrode is measured as for example relative to ground. In mutual capacitance, the mutual capcitance between at least first and second electrodes is measured. In either case, each of the nodes 42 works independent of the other nodes 42 so as to produce simultaneously occurring signals representative of different points on the nanostructure-film touch screen 36.

In order to produce a transparent nanostructure-film touch screen 36, the capacitance sensing nodes 42 are formed with a transparent conductive medium comprising at least one nanostructure film. In self capacitance sensing arrangements, the transparent conductive medium is patterned into spatially separated electrodes and traces. Each of the electrodes represents a different coordinate and the traces connect the electrodes to a capacitive sensing circuit. The coordinates may be associated with Cartesian coordinate system (x and y), Polar coordinate system (r, .theta.) or some other coordinate system. In a Cartesian coordinate system, the electrodes may be positioned in columns and rows so as to form a grid array with each electrode representing a different x, y coordinate. During operation, the capacitive sensing circuit monitors changes in capacitance that occur at each of the electrodes. The positions where changes occur and the magnitude of those changes are used to help recognize the multiple touch events. A change in capacitance typically occurs at an electrode when a user places an object such as a finger in close proximity to the electrode, i.e., the object steals charge thereby affecting the capacitance.

In mutual capacitance, the transparent conductive medium is patterned into a group of spatially separated lines formed on two different layers. Driving lines are formed on a first layer and sensing lines are formed on a second layer. Although separated by being on different layers, the sensing lines traverse, intersect or cut across the driving lines thereby forming a capacitive coupling node. The manner in which the sensing lines cut across the driving lines generally depends on the coordinate system used. For example, in a Cartesian coordinate system, the sensing lines are perpendicular to the driving lines thereby forming nodes with distinct x and y coordinates. Alternatively, in a polar coordinate system, the sensing lines may be concentric circles and the driving lines may be radially extending lines (or vice versa). The driving lines are connected to a voltage source and the sensing lines are connected to capacitive sensing circuit. During operation, a current is driven through one driving line at a time, and because of capacitive coupling, the current is carried through to the sensing lines at each of the nodes (e.g., intersection points). Furthermore, the sensing circuit monitors changes in capacitance that occurs at each of the nodes. The positions where changes occur and the magnitude of those changes are used to help recognize the multiple touch events. A change in capacitance typically occurs at a capacitive coupling node when a user places an object such as a finger in close proximity to the capacitive coupling node, i.e., the object steals charge thereby affecting the capacitance.

Figure 3:
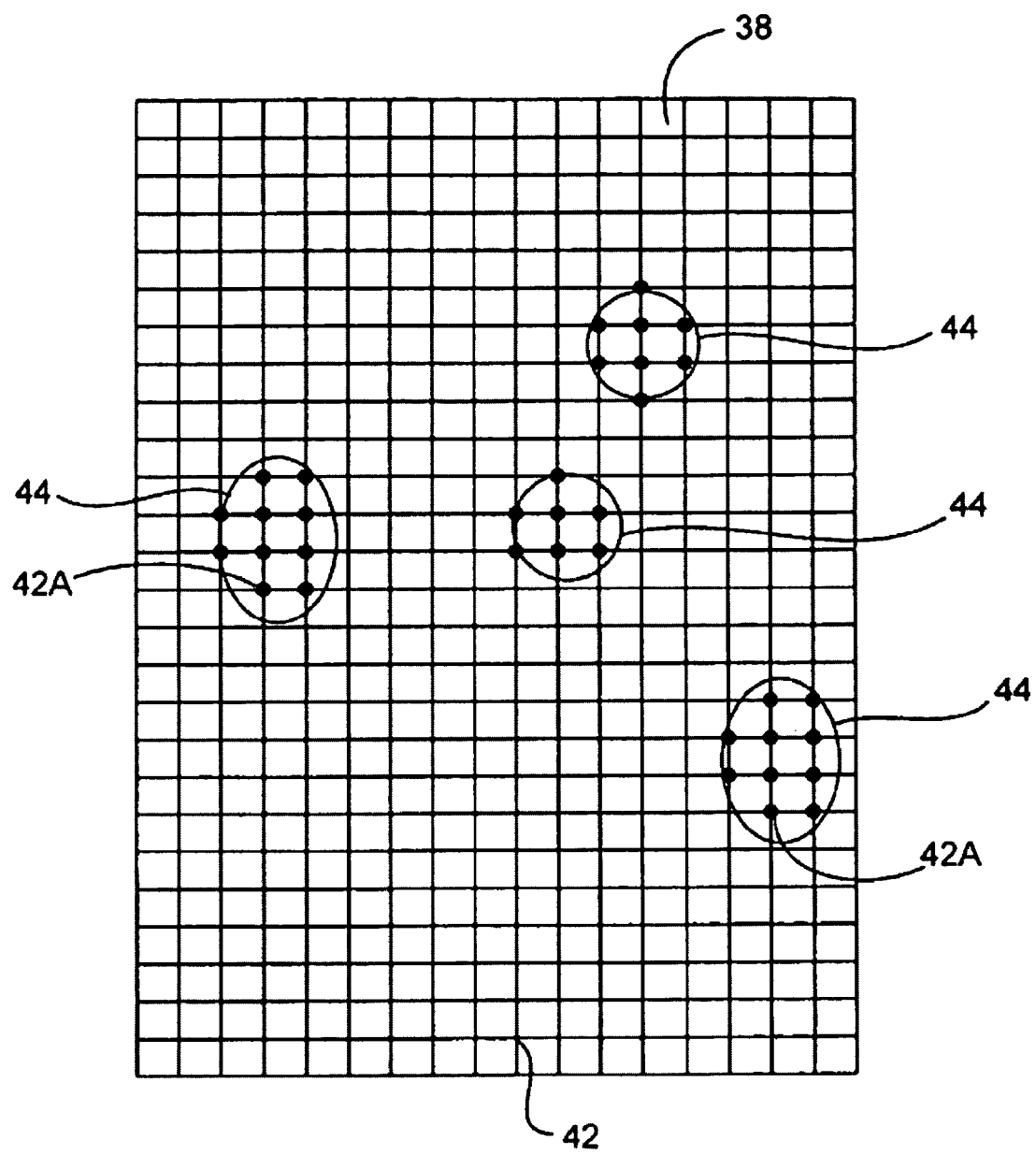
FIG. 3 shows an image of the nanostructure-film touch screen plane at a particular point in time, in accordance with one embodiment of the present invention.

By way of example, the signals generated at the nodes 42 of the nanostructure-film touch screen 36 may be used to produce an image of the touch screen plane at a particular point in time. Referring to FIG. 3, each object in contact with a touch sensitive surface 38 of the nanostructure-film touch screen 36 produces a contact patch area 44. Each of the contact patch areas 44 covers several nodes 42. The covered nodes 42 detect surface contact while the remaining nodes 42 do not detect surface contact. As a result, a pixilated image of the touch screen plane can be formed. The signals for each contact patch area 44 may be grouped together to form individual images representative of the contact patch area 44. The image of each contact patch area 44 may include high and low points based on the pressure at each point. The shape of the image as well as the high and low points within the image may be used to differentiate contact patch areas 44 that are in close proximity to one another. Furthermore, the current image, and more particularly the image of each contact patch area 44 can be compared to previous images to determine what action to perform in a host device.

Nanostructure films according to the embodiments of the present invention may be patterned by methods including, but not limited to, laser etching, dry etching, stamping and/or liftoff. Patterning methods according to one embodiment of the present invention are specifically tuned for etching nanostructure films.

For example, solid state UV laser etching may achieve etch resolutions of less than 5-10 microns in FWNT films, as described above, in single passes even at power levels as low as 17 watts. Such etching may be performed on a roll-to-roll apparatus, whereon a nanostructure film is moving at a rate of more than 1-2 meters/second. Etching may be tuned by adjusting the laser power, pulse duration (e.g., milliseconds to femtoseconds) and/or type (e.g., excimer, solid state, gas, chemical, fiber-hosted, semiconductor, dye and/or free electron) employed. High-power, short-pulse lasers may be desirable for improving throughput, while lower-power, long-pulse lasers may be desirable for improving etch selectivity.

In another example, an inert gas dry etching process (e.g., reactive ion etching (RIE)) may be employed to etch carbon nanostructures. As used herein, an "inert gas" refers to any gas, elemental or molecular, that is not significantly reactive under normal circumstances (e.g., noble gases). Additionally, an "inert gas" shall include certain so-called pseudo-inert gases, which are not usually considered inert but which behave like inert gases under given conditions (e.g., low pressure and/or plasma) and therefore can often be used inert gas substitutes in dry etching processes. Inert gases have conventionally been used in dry etching processes only as dilutants rather than etchants, since they do not react significantly with most integrated-circuit (IC) materials. However, as employed in the present invention, such gases (e.g., Ar, He, Ne, Xe) can be employed as effective etch gases (e.g., for carbon), and are advantageous over many other dry etching processes (e.g., oxygen ($O_2$) plasma) in that they can allow high selectivity control between, for example, carbon nanostructures (e.g., nanotubes) and protection layer materials such as silicon nitride ($SiN_x$:H), silicon dioxide ($SiO_2$), amorphous silicon (a-Si:) and poly-silicon (poly-Si). Moreover, the use of inert gas plasmas can avoid the undesirable etch-residue-induced contamination, halogen polymer residues, and/or corrosion species caused by many fluorine (F) and chlorine (Cl) induced plasma etching processes. Conventional dry etch gases (e.g., $O_2$, F, Cl) may be used as well or instead. Additionally, etching with oxygen at atmospheric pressure and temperature has been effective in patterning nanostructure films, specifically those comprising carbon nanotubes.

In another exemplary embodiment, a nanostructure film may be patterned during deposition, using a patterned stamp. Such a process may be scaled-up using, for example, micro-gravure printing, wherein the micro-gravure coater has a patterned surface.

Referring back to FIG. 2, the display arrangement 30 may be a stand alone unit or it may integrated with other devices. When stand alone, the display arrangement 32 (or each of its components) acts like a peripheral device (monitor) that includes its own housing and that can be coupled to a host device through wired or wireless connections. When integrated, the display arrangement 30 shares a housing and is hard wired into the host device thereby forming a single unit. By way of example, the display arrangement 30 may be disposed inside a variety of host devices including but not limited to general purpose computers such as a desktop, laptop or tablet computers, handhelds such as PDAs and media players such as music players, or peripheral devices such as cameras, printers and/or the like.

Figure 4:
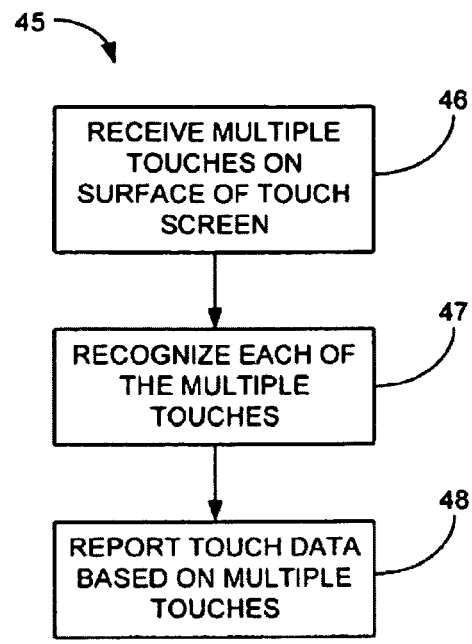
FIG. 4 is a multipoint touch method, in accordance with one embodiment of the present invention.

FIG. 4 is a multipoint touch method 45, in accordance with one embodiment of the present invention. The method generally begins at block 46 where multiple touches are received on the surface of the nanostructure-film touch screen at the same time. This may for example be accomplished by placing multiple fingers on the surface of the nanostructure-film touch screen. Following block 46, the process flow proceeds to block 47 where each of the multiple touches is separately recognized by the nanostructure-film touch screen. This may for example be accomplished by multipoint capacitance sensors located within the nanostructure-film touch screen. Following block 47, the process flow proceeds to block 48 where the touch data based on multiple touches is reported. The touch data may for example be reported to a host device such as a general purpose computer.

Figure 5:
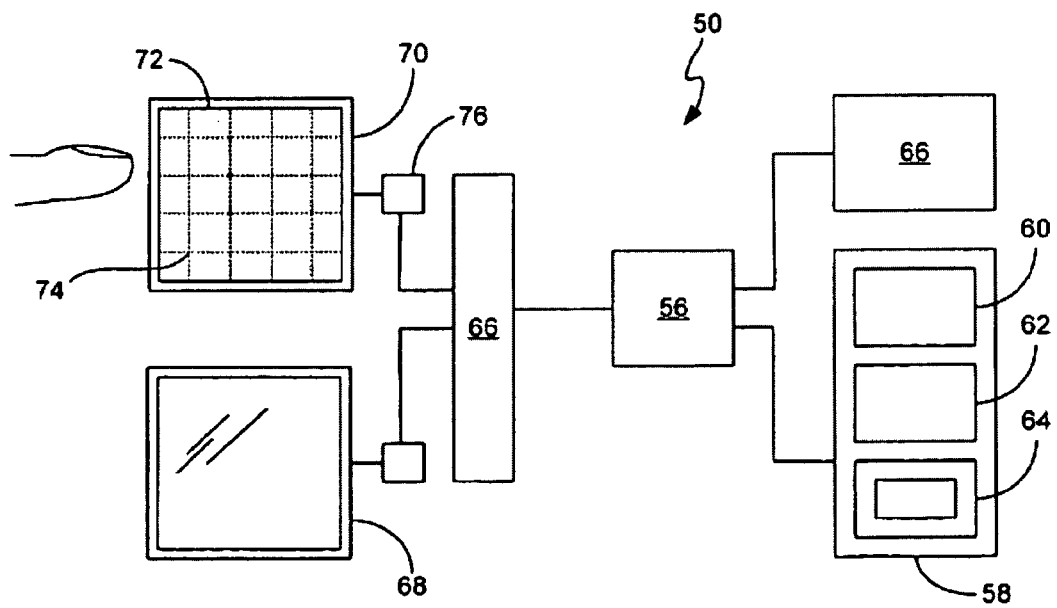
FIG. 5 is a block diagram of a computer system, in accordance with one embodiment of the present invention.

FIG. 5 is a block diagram of a computer system 50, in accordance with one embodiment of the present invention. The computer system 50 may correspond to personal computer systems such as desktops, laptops, tablets or handhelds. By way of example, the computer system may correspond to any Apple or PC based computer system. The computer system may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

As shown, the computer system 50 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be a single-chip processor or can be implemented with multiple components.

In most cases, the processor 56 together with an operating system operates to execute computer code and produce and use data. The computer code and data may reside within a program storage block 58 that is operatively coupled to the processor 56. Program storage block 58 generally provides a place to hold data that is being used by the computer system 50. By way of example, the program storage block may include Read-Only Memory (ROM) 60, Random-Access Memory (RAM) 62, hard disk drive 64 and/or the like. The computer code and data could also reside on a removable storage medium and loaded or installed onto the computer system when needed. Removable storage mediums include, for example, CD-ROM, PC-CARD, floppy disk, magnetic tape, and a network component.

The computer system 50 also includes an input/output (I/O) controller 66 that is operatively coupled to the processor 56. The (I/O) controller 66 may be integrated with the processor 56 or it may be a separate component as shown. The I/O controller 66 is generally configured to control interactions with one or more I/O devices. The I/O controller 66 generally operates by exchanging data between the processor and the I/O devices that desire to communicate with the processor. The I/O devices and the I/O controller typically communicate through a data link 67. The data link 67 may be a one way link or two way link. In some cases, the I/O devices may be connected to the I/O controller 66 through wired connections. In other cases, the I/O devices may be connected to the I/O controller 66 through wireless connections. By way of example, the data link 67 may correspond to PS/2, USB, Firewire, IR, RF, Bluetooth or the like.

The computer system 50 also includes a display device 68 that is operatively coupled to the processor 56. The display device 68 may be a separate component (peripheral device) or it may be integrated with the processor and program storage to form a desktop computer (all in one machine), a laptop, handheld or tablet or the like. The display device 68 is configured to display a graphical user interface (GUI) including perhaps a pointer or cursor as well as other information to the user. By way of example, the display device 68 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The computer system 50 also includes a nanostructure-film touch screen 70 that is operatively coupled to the processor 56. The nanostructure-film touch screen 70 is a transparent panel that is positioned in front of the display device 68. The nanostructure-film touch screen 70 may be integrated with the display device 68 or it may be a separate component. The nanostructure-film touch screen 70 is configured to receive input from a user's touch and to send this information to the processor 56. In most cases, the nanostructure-film touch screen 70 recognizes touches and the position and magnitude of touches on its surface. The nanostructure-film touch screen 70 reports the touches to the processor 56 and the processor 56 interprets the touches in accordance with its programming. For example, the processor 56 may initiate a task in accordance with a particular touch.

In accordance with one embodiment, the nanostructure-film touch screen 70 is capable of tracking multiple objects, which rest on, tap on, or move across the touch sensitive surface of the nanostructure-film touch screen at the same time. The multiple objects may for example correspond to fingers and palms. Because the nanostructure-film touch screen is capable of tracking multiple objects, a user may perform several touch initiated tasks at the same time. For example, the user may select an onscreen button with one finger, while moving a cursor with another finger. In addition, a user may move a scroll bar with one finger while selecting an item from a menu with another finger. Furthermore, a first object may be dragged with one finger while a second object may be dragged with another finger. Moreover, gesturing may be performed with more than one finger.

To elaborate, the nanostructure-film touch screen 70 generally includes a sensing device 72 configured to detect an object in close proximity thereto and/or the pressure exerted thereon. The sensing device 72 may be widely varied. In one particular embodiment, the sensing device 72 is divided into several independent and spatially distinct sensing points, nodes or regions 74 that are positioned throughout the nanostructure-film touch screen 70. The sensing points 74, which are typically hidden from view, are dispersed about the nanostructure-film touch screen 70 with each sensing point 74 representing a different position on the surface of the nanostructure-film touch screen 70 (or touch screen plane). The sensing points 74 may be positioned in a grid or a pixel array where each pixilated sensing point 74 is capable of generating a signal at the same time. In the simplest case, a signal is produced each time an object is positioned over a sensing point 74. When an object is placed over multiple sensing points 74 or when the object is moved between or over multiple sensing point 74, multiple signals are generated.

The number and configuration of the sensing points 74 may be widely varied. The number of sensing points 74 generally depends on the desired sensitivity as well as the desired transparency of the nanostructure-film nanostructure-film touch screen 70. More nodes or sensing points generally increases sensitivity, but reduces transparency (and vice versa). With regards to configuration, the sensing points 74 generally map the touch screen plane into a coordinate system such as a Cartesian coordinate system, a Polar coordinate system or some other coordinate system. When a Cartesian coordinate system is used (as shown), the sensing points 74 typically correspond to x and y coordinates. When a Polar coordinate system is used, the sensing points typically correspond to radial (r) and angular coordinates (.theta.).

The nanostructure-film touch screen 70 may include a sensing circuit 76 that acquires the data from the sensing device 72 and that supplies the acquired data to the processor 56. Alternatively, the processor may include this functionality. In one embodiment, the sensing circuit 76 is configured to send raw data to the processor 56 so that the processor 56 processes the raw data. For example, the processor 56 receives data from the sensing circuit 76 and then determines how the data is to be used within the computer system 50. The data may include the coordinates of each sensing point 74 as well as the pressure exerted on each sensing point 74. In another embodiment, the sensing circuit 76 is configured to process the raw data itself. That is, the sensing circuit 76 reads the pulses from the sensing points 74 and turns them into data that the processor 56 can understand. The sensing circuit 76 may perform filtering and/or conversion processes. Filtering processes are typically implemented to reduce a busy data stream so that the processor 56 is not overloaded with redundant or non-essential data. The conversion processes may be implemented to adjust the raw data before sending or reporting them to the processor 56. The conversions may include determining the center point for each touch region (e.g., centroid).

The sensing circuit 76 may include a storage element for storing a touch screen program, which is a capable of controlling different aspects of the nanostructure-film touch screen 70. For example, the touch screen program may contain what type of value to output based on the sensing points 74 selected (e.g., coordinates). In fact, the sensing circuit in conjunction with the touch screen program may follow a predetermined communication protocol. As is generally well known, communication protocols are a set of rules and procedures for exchanging data between two devices. Communication protocols typically transmit information in data blocks or packets that contain the data to be transmitted, the data required to direct the packet to its destination, and the data that corrects errors that occur along the way. By way of example, the sensing circuit may place the data in a HID format (Human Interface Device).

The sensing circuit 76 generally includes one or more microcontrollers, each of which monitors one or more sensing points 74. The microcontrollers may for example correspond to an application specific integrated circuit (ASIC), which works with firmware to monitor the signals from the sensing device 72 and to process the monitored signals and to report this information to the processor 56.

In accordance with one embodiment, the sensing device 72 is based on capacitance. As should be appreciated, whenever two electrically conductive members come close to one another without actually touching, their electric fields interact to form capacitance. In most cases, the first electrically conductive member is a sensing point 74 and the second electrically conductive member is an object 80 such as a finger. As the object 80 approaches the surface of the nanostructure-film touch screen 70, a tiny capacitance forms between the object 80 and the sensing points 74 in close proximity to the object 80. By detecting changes in capacitance at each of the sensing points 74 and noting the position of the sensing points, the sensing circuit can recognize multiple objects, and determine the location, pressure, direction, speed and acceleration of the objects 80 as they are moved across the nanostructure-film touch screen 70. For example, the sensing circuit can determine when and where each of the fingers and palm of one or more hands are touching as well as the pressure being exerted by the finger and palm of the hand(s) at the same time.

The simplicity of capacitance allows for a great deal of flexibility in design and construction of the sensing device 72. By way of example, the sensing device 72 may be based on self capacitance or mutual capacitance. In self capacitance, each of the sensing points 74 is provided by an individual charged electrode. As an object approaches the surface of the nanostructure-film touch screen 70, the object capacitive couples to those electrodes in close proximity to the object thereby stealing charge away from the electrodes. The amount of charge in each of the electrodes are measured by the sensing circuit 76 to determine the positions of multiple objects when they touch the nanostructure-film touch screen 70. In mutual capacitance, the sensing device 72 includes a two layer grid of spatially separated lines or wires. In the simplest case, the upper layer includes lines in rows while the lower layer includes lines in columns (e.g., orthogonal). The sensing points 74 are provided at the intersections of the rows and columns. During operation, the rows are charged and the charge capacitively couples to the columns at the intersection. As an object approaches the surface of the nanostructure-film touch screen, the object capacitive couples to the rows at the intersections in close proximity to the object thereby stealing charge away from the rows and therefore the columns as well. The amount of charge in each of the columns is measured by the sensing circuit 76 to determine the positions of multiple objects when they touch the nanostructure-film touch screen 70.

FIG. 6 is a partial top view of a transparent multiple point nanostructure-film touch screen 100, in accordance with one embodiment of the present invention. By way of example, the nanostructure-film touch screen 100 may generally correspond to the nanostructure-film touch screen shown in FIGS. 2 and 4. The multipoint nanostructure-film touch screen 100 is capable of sensing the position and the pressure of multiple objects at the same time. This particular nanostructure-film touch screen 100 is based on self capacitance and thus it includes a plurality of transparent capacitive sensing electrodes 102, which each represent different coordinates in the plane of the nanostructure-film touch screen 100. The electrodes 102 are configured to receive capacitive input from one or more objects touching the nanostructure-film touch screen 100 in the vicinity of the electrodes 102. When an object is proximate an electrode 102, the object steals charge thereby affecting the capacitance at the electrode 102. The electrodes 102 are connected to a capacitive sensing circuit 104 through traces 106 that are positioned in the gaps 108 found between the spaced apart electrodes 102. The electrodes 102 are spaced apart in order to electrically isolate them from each other as well as to provide a space for separately routing the sense traces 106. The gap 108 is preferably made small so as to maximize the sensing area and to minimize optical differences between the space and the transparent electrodes.

As shown, the sense traces 106 are routed from each electrode 102 to the sides of the nanostructure-film touch screen 100 where they are connected to the capacitive sensing circuit 104. The capacitive sensing circuit 104 includes one or more sensor ICs 110 that measure the capacitance at each electrode 102 and that reports its findings or some form thereof to a host controller. The sensor ICs 110 may for example convert the analog capacitive signals to digital data and thereafter transmit the digital data over a serial bus to a host controller. Any number of sensor ICs may be used. For example, a single chip may be used for all electrodes, or multiple chips may be used for a single or group of electrodes. In most cases, the sensor ICs 110 report tracking signals, which are a function of both the position of the electrode 102 and the intensity of the capacitance at the electrode 102.

The electrodes 102, traces 106 and sensing circuit 104 are generally disposed on an optical transmissive member 112. In most cases, the optically transmissive member 112 is formed from a clear material such as glass or plastic. The electrode 102 and traces 106 may be placed on the member 112 using any suitable patterning technique including for example, deposition, etching, printing and the like. The electrodes 102 and sense traces 106 comprise nanostructure films. By way of example, the electrodes 102 and traces 106 may be formed from random networks of FWNTs. In addition, the sensor ICs 110 of the sensing circuit 104 can be electrically coupled to the traces 106 using any suitable techniques. In one implementation, the sensor ICs 110 are placed directly on the member 112 (flip chip). In another implementation, a flex circuit is bonded to the member 112, and the sensor ICs 110 are attached to the flex circuit. In yet another implementation, a flex circuit is bonded to the member 112, a PCB is bonded to the flex circuit and the sensor ICs 110 are attached to the PCB. The sensor ICs may for example be capacitance sensing ICs.

The distribution of the electrodes 102 may be widely varied. For example, the electrodes 102 may be positioned almost anywhere in the plane of the nanostructure-film touch screen 100. The electrodes 102 may be positioned randomly or in a particular pattern about the touch screen 100. With regards to the later, the position of the electrodes 102 may depend on the coordinate system used. For example, the electrodes 102 may be placed in an array of rows and columns for Cartesian coordinates or an array of concentric and radial segments for polar coordinates. Within each array, the rows, columns, concentric or radial segments may be stacked uniformly relative to the others or they may be staggered or offset relative to the others. Additionally, within each row or column, or within each concentric or radial segment, the electrodes 102 may be staggered or offset relative to an adjacent electrode 102.

Furthermore, the electrodes 102 may be formed from almost any shape whether simple (e.g., squares, circles, ovals, triangles, rectangles, polygons, and the like) or complex (e.g., random shapes). Further still, the shape of the electrodes 102 may have identical shapes or they may have different shapes. For example, one set of electrodes 102 may have a first shape while a second set of electrodes 102 may have a second shape that is different than the first shape. The shapes are generally chosen to maximize the sensing area and to minimize optical differences between the gaps and the transparent electrodes.

In addition, the size of the electrodes 102 may vary according to the specific needs of each device. In some cases, the size of the electrodes 102 corresponds to about the size of a finger tip. For example, the size of the electrodes 102 may be on the order of 4-5 mm2. In other cases, the size of the electrodes 102 are smaller than the size of the finger tip so as to improve resolution of the nanostructure-film touch screen 100 (the finger can influence two or more electrodes at any one time thereby enabling interpolation). Like the shapes, the size of the electrodes 102 may be identical or they may be different. For example, one set of electrodes 102 may be larger than another set of electrodes 102. Moreover, any number of electrodes 102 may be used. The number of electrodes 102 is typically determined by the size of the nanostructure-film touch screen 100 as well as the size of each electrode 102. In most cases, it would be desirable to increase the number of electrodes 102 so as to provide higher resolution, i.e., more information can be used for such things as acceleration.

Although the sense traces 106 can be routed a variety of ways, they are typically routed in manner that reduces the distance they have to travel between their electrode 102 and the sensor circuit 104, and that reduces the size of the gaps 108 found between adjacent electrodes 102. The width of the sense traces 106 are also widely varied. The widths are generally determined by the amount of charge being distributed there through, the number of adjacent traces 106, and the size of the gap 108 through which they travel. It is generally desirable to maximize the widths of adjacent traces 106 in order to maximize the coverage inside the gaps 108 thereby creating a more uniform optical appearance.

In the illustrated embodiment, the electrodes 102 are positioned in a pixilated array. As shown, the electrodes 102 are positioned in rows 116 that extend to and from the sides of the nanostructure-film touch screen 100. Within each row 116, the identical electrodes 102 are spaced apart and positioned laterally relative to one another (e.g., juxtaposed). Furthermore, the rows 116 are stacked on top of each other thereby forming the pixilated array. The sense traces 106 are routed in the gaps 108 formed between adjacent rows 106. The sense traces 106 for each row are routed in two different directions. The sense traces 106 on one side of the row 116 are routed to a sensor IC 110 located on the left side and the sense traces 106 on the other side of the row 116 are routed to another sensor IC 110 located on the right side of the nanostructure-film touch screen 100. This is done to minimize the gap 108 formed between rows 116. The gap 108 may for example be held to about 20 microns. As should be appreciated, the spaces between the traces can stack thereby creating a large gap between electrodes. If routed to one side, the size of the space would be substantially doubled thereby reducing the resolution of the touch screen. Moreover, the shape of the electrode 102 is in the form of a parallelogram, and more particularly a parallelogram with sloping sides.

FIG. 7 is a partial top view of a transparent multi point nanostructure-film touch screen 120, in accordance with one embodiment of the present invention. In this embodiment, the nanostructure-film touch screen 120 is similar to the nanostructure-film touch screen 100 shown in FIG. 6, however, unlike the nanostructure-film touch screen 100 of FIG. 6, the nanostructure-film touch screen 120 shown in FIG. 7 includes electrodes 122 with different sizes. As shown, the electrodes 122 located in the center of the nanostructure-film touch screen 120 are larger than the electrodes 122 located at the sides of the nanostructure-film touch screen 120. In fact, the height of the electrodes 122 gets correspondingly smaller when moving from the center to the edge of the nanostructure-film touch screen 120. This is done to make room for the sense traces 124 extending from the sides of the more centrally located electrodes 122. This arrangement advantageously reduces the gap found between adjacent rows 126 of electrodes 122. Although the height of each electrode 122 shrinks, the height H of the row 126 as well as the width W of each electrode 122 stays the same. In one configuration, the height of the row 126 is substantially equal to the width of each electrode 122. For example, the height of the row 126 and the width of each electrode 122 may be about 4 mm to about 5 mm.

FIG. 8 is a front elevation view, in cross section of a display arrangement 130, in accordance with one embodiment of the present invention. The display arrangement 130 includes an LCD display 132 and a nanostructure-film touch screen 134 positioned over the LCD display 132. The nanostructure-film touch screen may for example correspond to the nanostructure-film touch screen shown in FIG. 6 or 7. The LCD display 132 may correspond to any conventional LCD display known in the art. Although not shown, the LCD display 132 typically includes various layers including a fluorescent panel, polarizing filters, a layer of liquid crystal cells, a color filter and the like.

The nanostructure-film touch screen 134 includes a transparent electrode layer 136 that is positioned over a glass member 138. The glass member 138 may be a portion of the LCD display 132 or it may be a portion of the nanostructure-film touch screen 134. In either case, the glass member 138 is a relatively thick piece of clear glass that protects the display 132 from forces, which are exerted on the nanostructure-film touch screen 134. The thickness of the glass member 138 may for example be about 2 mm. In most cases, the electrode layer 136 is disposed on the glass member 138 using the nanostructure-film deposition and patterning techniques described above, such as slot-die coating and laser etching. Although not shown, in some cases, it may be necessary to coat the electrode layer 136 with a material of similar refractive index to improve the visual appearance of the touch screen. As should be appreciated, the gaps located between electrodes and traces do not have the same optical index as the electrodes and traces, and therefore a material may be needed to provide a more similar optical index. By way of example, index matching gels may be used.

The nanostructure-film touch screen 134 also includes a protective cover sheet 140 disposed over the electrode layer 136. The electrode layer 136 is therefore sandwiched between the glass member 138 and the protective cover sheet 140. The protective sheet 140 serves to protect the under layers and provide a surface for allowing an object to slide thereon. The protective sheet 140 also provides an insulating layer between the object and the electrode layer 136. The protective cover sheet 140 may be formed from any suitable clear material such as glass and plastic. The protective cover sheet 140 is suitably thin to allow for sufficient electrode coupling. By way of example, the thickness of the cover sheet 140 may be between about 0.3-0.8 mm. In addition, the protective cover sheet 140 may be treated with coatings to reduce sticktion when touching and reduce glare when viewing the underlying LCD display 132. By way of example, a low sticktion/anti reflective coating 142 may be applied over the cover sheet 140. Although the electrode layer 136 is typically patterned on the glass member 138, it should be noted that in some cases it may be alternatively or additionally patterned on the protective cover sheet 140.

Figure 9:
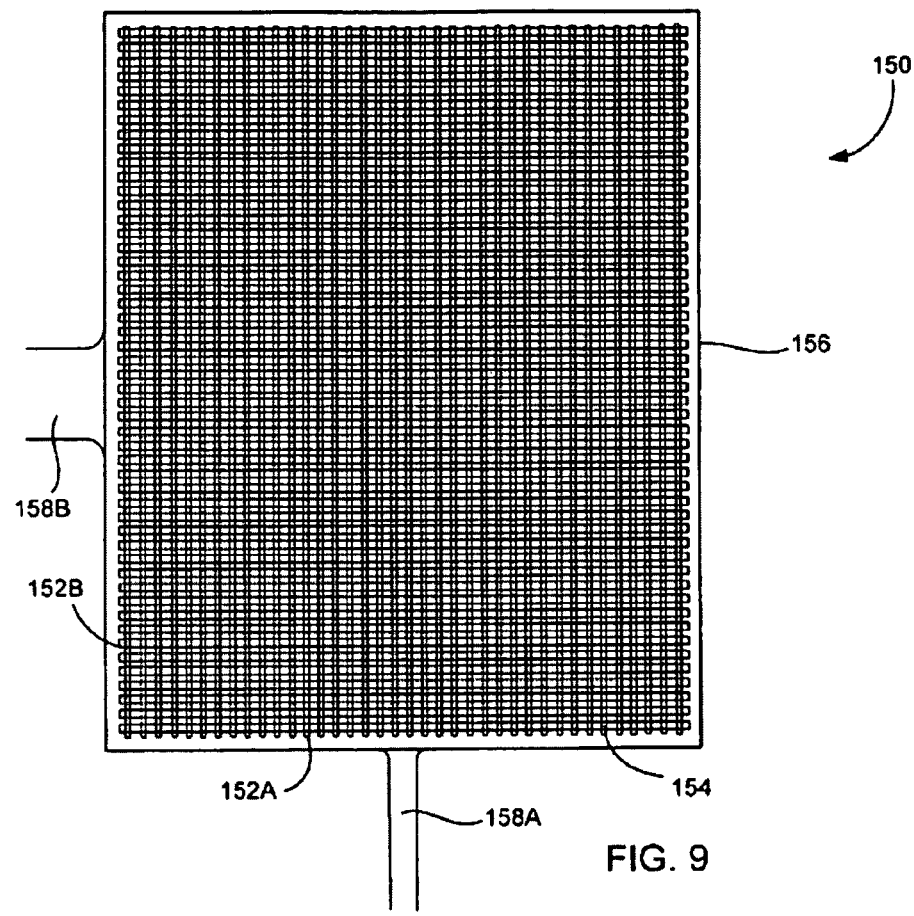
FIG. 9 is a top view of a transparent multipoint nanostructure-film touch screen, in accordance with another embodiment of the present invention.

FIG. 9 is a top view of a transparent multipoint nanostructure-film touch screen 150, in accordance with another embodiment of the present invention. By way of example, the nanostructure-film touch screen 150 may generally correspond to the nanostructure-film touch screen of FIGS. 2 and 4. Unlike the nanostructure-film touch screen shown in FIGS. 6-8, the nanostructure-film touch screen of FIG. 9 utilizes the concept of mutual capacitance rather than self capacitance. As shown, the nanostructure-film touch screen 150 includes a two layer grid of spatially separated lines or wires 152. In most cases, the lines 152 on each layer are parallel one another. Furthermore, although in different planes, the lines 152 on the different layers are configured to intersect or cross in order to produce capacitive sensing nodes 154, which each represent different coordinates in the plane of the nanostructure-film touch screen 150. The nodes 154 are configured to receive capacitive input from an object touching the nanostructure-film touch screen 150 in the vicinity of the node 154. When an object is proximate the node 154, the object steals charge thereby affecting the capacitance at the node 154.

To elaborate, the lines 152 on different layers serve two different functions. One set of lines 152A drives a current therethrough while the second set of lines 152B senses the capacitance coupling at each of the nodes 154. In most cases, the top layer provides the driving lines 152A while the bottom layer provides the sensing lines 152B. The driving lines 152A are connected to a voltage source (not shown) that separately drives the current through each of the driving lines 152A. That is, the stimulus is only happening over one line while all the other lines are grounded. They may be driven similarly to a raster scan. The sensing lines 152B are connected to a capacitive sensing circuit (not shown) that continuously senses all of the sensing lines 152B (always sensing).

When driven, the charge on the driving line 152A capacitively couples to the intersecting sensing lines 152B through the nodes 154 and the capacitive sensing circuit senses all of the sensing lines 152B in parallel. Thereafter, the next driving line 152A is driven, and the charge on the next driving line 152A capacitively couples to the intersecting sensing lines 152B through the nodes 154 and the capacitive sensing circuit senses all of the sensing lines 152B in parallel. This happens sequential until all the lines 152A have been driven. Once all the lines 152A have been driven, the sequence starts over (continuously repeats). In most cases, the lines 152A are sequentially driven from one side to the opposite side.

The capacitive sensing circuit typically includes one or more sensor ICs that measure the capacitance in each of the sensing lines 152B and that reports its findings to a host controller. The sensor ICs may for example convert the analog capacitive signals to digital data and thereafter transmit the digital data over a serial bus to a host controller. Any number of sensor ICs may be used. For example, a sensor IC may be used for all lines, or multiple sensor ICs may be used for a single or group of lines. In most cases, the sensor ICs 110 report tracking signals, which are a function of both the position of the node 154 and the intensity of the capacitance at the node 154.

The lines 152 are generally disposed on one or more optical transmissive members 156 formed from a clear material such as glass or plastic. By way of example, the lines 152 may be placed on opposing sides of the same member 156 or they may be placed on different members 156. The lines 152 may be placed on the member 156 using any suitable patterning technique including for example, deposition, etching, printing and the like. The driving lines 152A are typically coupled to the voltage source through a flex circuit 158A, and the sensing lines 152B are typically coupled to the sensing circuit, and more particularly the sensor ICs through a flex circuit 158B. The sensor ICs may be attached to a printed circuit board (PCB). Alternatively, the sensor ICs may be placed directly on the member 156 thereby eliminating the flex circuit 158B.

The distribution of the lines 152 may be widely varied. For example, the lines 152 may be positioned almost anywhere in the plane of the nanostructure-film touch screen 150. The lines 152 may be positioned randomly or in a particular pattern about the nanostructure-film touch screen 150. With regards to the later, the position of the lines 152 may depend on the coordinate system used. For example, the lines 152 may be placed in rows and columns for Cartesian coordinates or concentrically and radially for polar coordinates. When using rows and columns, the rows and columns may be placed at various angles relative to one another. For example, they may be vertical, horizontal or diagonal.

Furthermore, the lines 152 may be formed from almost any shape whether rectilinear or curvilinear. The lines on each layer may be the same or different. For example, the lines may alternate between rectilinear and curvilinear. Further still, the shape of the opposing lines may have identical shapes or they may have different shapes. For example, the driving lines may have a first shape while the sensing lines may have a second shape that is different than the first shape. The geometry of the lines 152 (e.g., linewidths and spacing) may also be widely varied. The geometry of the lines within each layer may be identical or different, and further, the geometry of the lines for both layers may be identical or different. By way of example, the linewidths of the sensing lines 152B to driving lines 152A may have a ratio of about 2:1.

Moreover, any number of lines 152 may be used. It is generally believed that the number of lines is dependent on the desired resolution of the nanostructure-film touch screen 150. The number of lines within each layer may be identical or different. The number of lines is typically determined by the size of the nanostructure-film touch screen as well as the desired pitch and linewidths of the lines 152.

In the illustrated embodiment, the driving lines 152A are positioned in rows and the sensing lines 152B are positioned in columns that are perpendicular to the rows. The rows extend horizontally to the sides of the nanostructure-film touch screen 150 and the columns extend vertically to the top and bottom of the nanostructure-film touch screen 150. Furthermore, the linewidths for the set of lines 152A and 152B are different and the pitch for set of lines 152A and 152B are equal to one another. In most cases, the linewidths of the sensing lines 152B are larger than the linewidths of the driving lines 152A. By way of example, the pitch of the driving and sensing lines 152 may be about 5 mm, the linewidths of the driving lines 152A may be about 1.05 mm and the linewidths of the sensing lines 152B may be about 2.10 mm. Moreover, the number of lines 152 in each layer is different. For example, there may be about 38 driving lines and about 50 sensing lines.

As mentioned above, the lines in order to form semi-transparent conductors on glass, film or plastic, may be a patterned nanostructure film. This is generally accomplished by depositing a nanostructure film over the substrate surface and then etching away portions of the nanostructure film in order to form the lines. Additionally or alternatively, the pattern may be formed by a selective deposition method (e.g., stamping, inkjet printing, gravure coating). As should be appreciated, the areas with nanostructure film tend to have lower transparency than the areas without nanostructure film. This is generally less desirable for the user as the user can distinguish the lines from the spaces therebetween, i.e., the patterned nanostructure film can become quite visible thereby producing a touch screen with undesirable optical properties.

In order to prevent the aforementioned problem, the dead areas between the patterned nanostructure-film lines may be filled with indexing matching materials. In another embodiment, rather than simply etching away all of the nanostructure film, the dead areas (the uncovered spaces) may be subdivided into unconnected electrically floating nanostructure-film pads, i.e., the dead areas may be patterned with spatially separated pads. The pads are typically separated with a minimum trace width. Furthermore, the pads are typically made small to reduce their impact on the capacitive measurements. This technique attempts to minimize the appearance of the lines by creating a uniform optical retarder. That is, by seeking to create a uniform nanostructure film, it is believed that the panel will function closer to a uniform optical retarder and therefore non-uniformities in the visual appearance will be minimized. In yet another embodiment, a combination of index matching materials and unconnected floating pads may be used.

Figure 10:
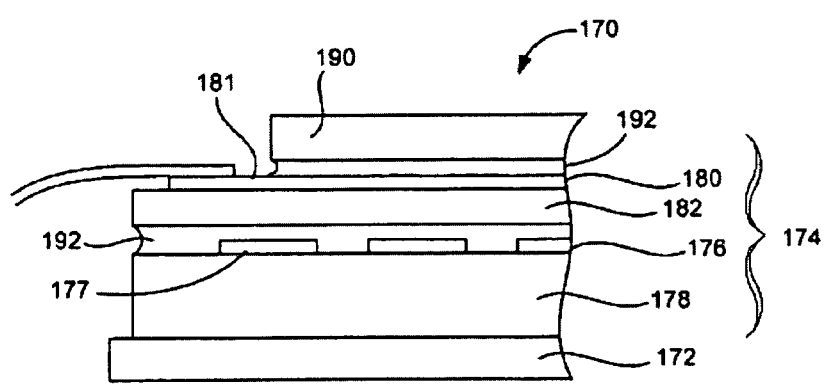
FIG. 10 is a partial front elevation view, in cross section of a display arrangement, in accordance with one embodiment of the present invention.

FIG. 10 is a partial front elevation view, in cross section of a display arrangement 170, in accordance with one embodiment of the present invention. The display arrangement 170 includes an LCD display 172 and a nanostructure-film touch screen 174 positioned over the LCD display 170. The nanostructure-film touch screen may for example correspond to the nanostructure-film touch screen shown in FIG. 9. The LCD display 172 may correspond to any conventional LCD display known in the art. Although not shown, the LCD display 172 typically includes various layers including a fluorescent panel, polarizing filters, a layer of liquid crystal cells, a color filter and the like.

The nanostructure-film touch screen 174 includes a transparent sensing layer 176 that is positioned over a first glass member 178. The sensing layer 176 includes a plurality of sensor lines 177 positioned in columns (extend in and out of the page). The first glass member 178 may be a portion of the LCD display 172 or it may be a portion of the nanostructure-film touch screen 174. For example, it may be the front glass of the LCD display 172 or it may be the bottom glass of the nanostructure-film touch screen 174. The sensor layer 176 is typically disposed on the glass member 178 using suitable transparent conductive materials and patterning techniques. In some cases, it may be necessary to coat the sensor layer 176 with material of similar refractive index to improve the visual appearance, i.e., make more uniform.

The nanostructure-film touch screen 174 also includes a transparent driving layer 180 that is positioned over a second glass member 182. The second glass member 182 is positioned over the first glass member 178. The sensing layer 176 is therefore sandwiched between the first and second glass members 178 and 182. The second glass member 182 provides an insulating layer between the driving and sensing layers 176 and 180. The driving layer 180 includes a plurality of driving lines 181 positioned in rows (extend to the right and left of the page). The driving lines 181 are configured to intersect or cross the sensing lines 177 positioned in columns in order to form a plurality of capacitive coupling nodes 182. Like the sensing layer 176, the driving layer 180 is disposed on the glass member using suitable materials and patterning techniques. Furthermore, in some cases, it may be necessary to coat the driving layer 180 with material of similar refractive index to improve the visual appearance. Although the sensing layer is typically patterned on the first glass member, it should be noted that in some cases it may be alternatively or additionally patterned on the second glass member.

The nanostructure-film touch screen 174 also includes a protective cover sheet 190 disposed over the driving layer 180. The driving layer 180 is therefore sandwiched between the second glass member 182 and the protective cover sheet 190. The protective cover sheet 190 serves to protect the under layers and provide a surface for allowing an object to slide thereon. The protective cover sheet 190 also provides an insulating layer between the object and the driving layer 180. The protective cover sheet is suitably thin to allow for sufficient coupling. The protective cover sheet 190 may be formed from any suitable clear material such as glass and plastic. In addition, the protective cover sheet 190 may be treated with coatings to reduce sticktion when touching and reduce glare when viewing the underlying LCD display 172. By way of example, a low sticktion/anti reflective coating may be applied over the cover sheet 190. Although the line layer is typically patterned on a glass member, it should be noted that in some cases it may be alternatively or additionally patterned on the protective cover sheet.

The nanostructure-film touch screen 174 also includes various bonding layers 192. The bonding layers 192 bond the glass members 178 and 182 as well as the protective cover sheet 190 together to form the laminated structure and to provide rigidity and stiffness to the laminated structure. In essence, the bonding layers 192 help to produce a monolithic sheet that is stronger than each of the individual layers taken alone. In most cases, the first and second glass members 178 and 182 as well as the second glass member and the protective sheet 182 and 190 are laminated together using a bonding agent such as glue. The compliant nature of the glue may be used to absorb geometric variations so as to form a singular composite structure with an overall geometry that is desirable. In some cases, the bonding agent includes an index matching material to improve the visual appearance of the nanostructure-film touch screen 170.

With regards to configuration, each of the various layers may be formed with various sizes, shapes, and the like. For example, each of the layers may have the same thickness or a different thickness than the other layers in the structure. In the illustrated embodiment, the first glass member 178 has a thickness of about 1.1 mm, the second glass member 182 has a thickness of about 0.4 mm and the protective sheet has a thickness of about 0.55 mm. The thickness of the bonding layers 192 typically varies in order to produce a laminated structure with a desired height. Furthermore, each of the layers may be formed with various materials. By way of example, each particular type of layer may be formed from the same or different material. For example, any suitable glass or plastic material may be used for the glass members. In a similar manner, any suitable bonding agent may be used for the bonding layers 192.

Figure 11A:
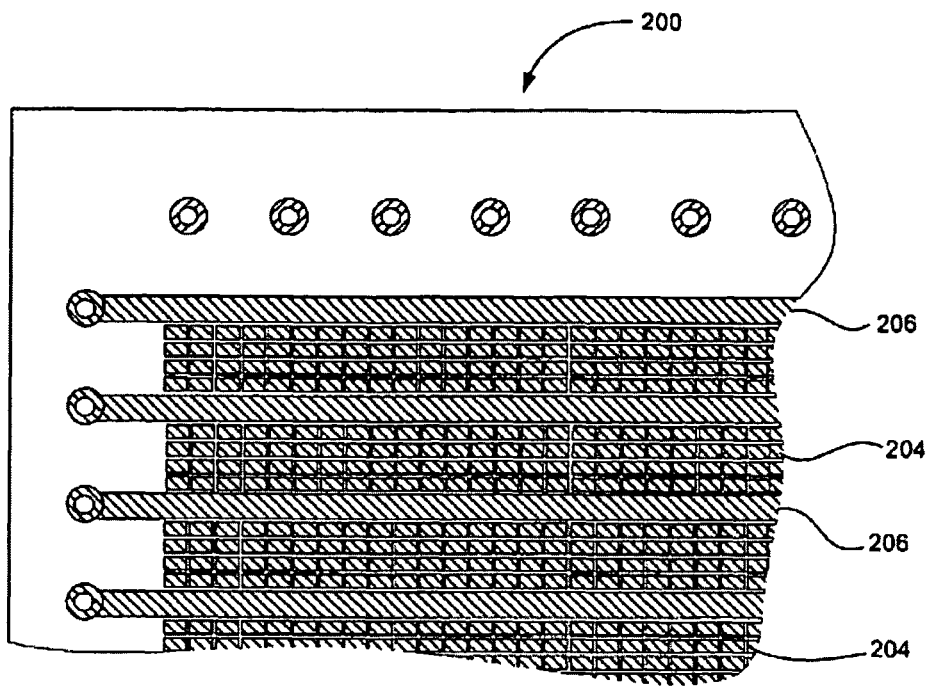
FIGS. 11A and 11B are partial top view diagrams of a driving layer and a sensing layer, in accordance with one embodiment.
Figure 11B:
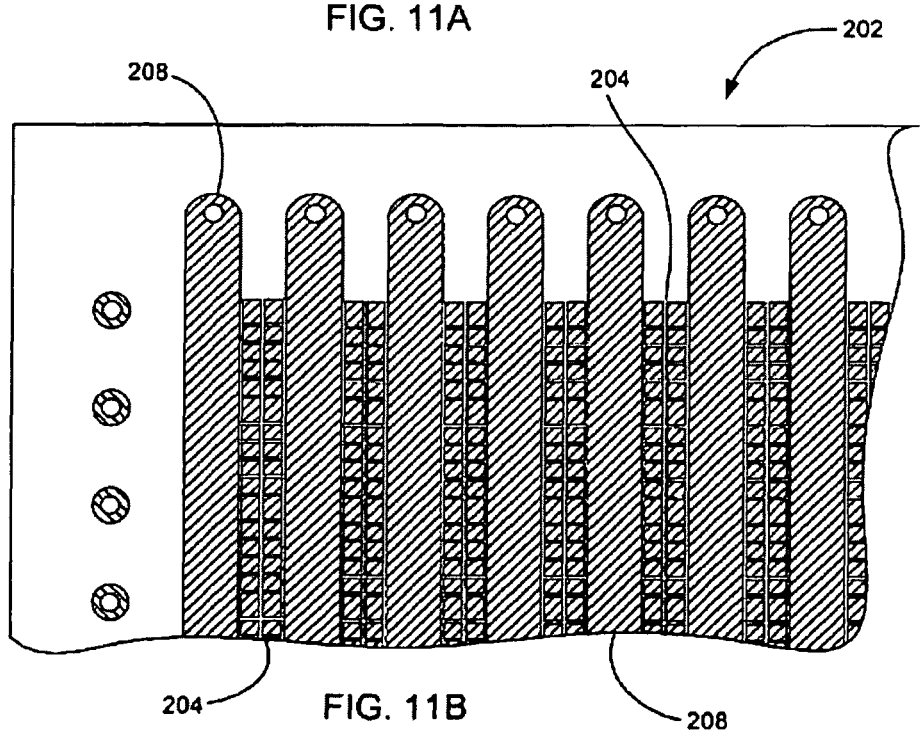

FIGS. 11A and 11B are partial top view diagrams of a driving layer 200 and a sensing layer 202, in accordance with one embodiment. In this embodiment, each of the layers 200 and 202 includes dummy features 204 disposed between the driving lines 206 and the sensing lines 208. The dummy features 204 are configured to optically improve the visual appearance of the nanostructure-film touch screen by more closely matching the optical index of the lines. While index matching materials may improve the visual appearance, it has been found that there still may exist some non-uniformities. The dummy features 204 provide the nanostructure-film touch screen with a more uniform appearance. The dummy features 204 are electrically isolated and positioned in the gaps between each of the lines 206 and 208. Although they may be patterned separately, the dummy features 204 are typically patterned along with the lines 206 and 208. Furthermore, although they may be formed from different materials, the dummy features 204 are typically formed with nanostructure film to provide the best possible index matching. As should be appreciated, the dummy features will more than likely still produce some gaps, but these gaps are much smaller than the gaps found between the lines (many orders of magnitude smaller). These gaps, therefore have minimal impact on the visual appearance. While this may be the case, index matching materials may be additionally applied to the gaps between the dummy features to further improve the visual appearance of the nanostructure-film touch screen. The distribution, size, number, dimension, and shape of the dummy features may be widely varied.

Figure 12:
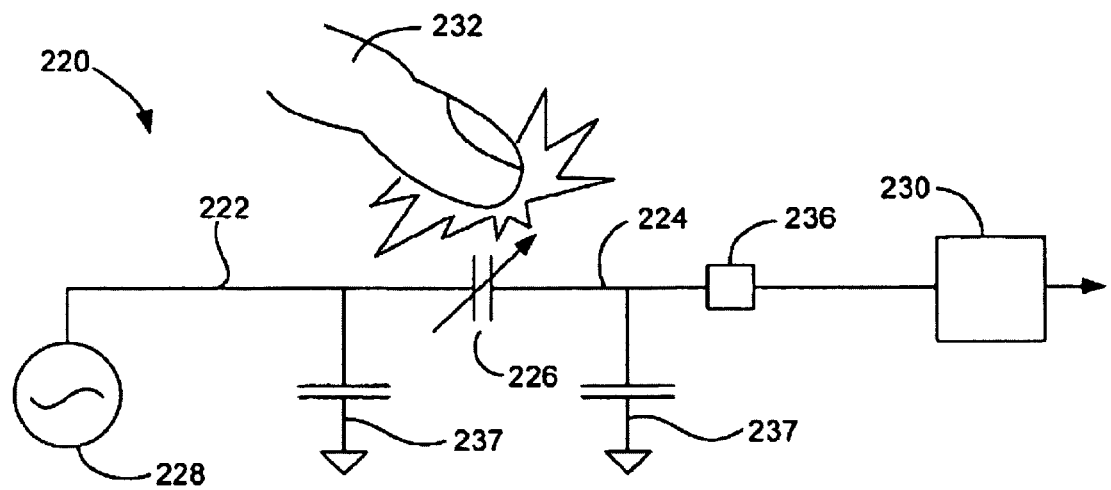
FIG. 12 is a simplified diagram of a mutual capacitance circuit, in accordance with one embodiment of the present invention.

FIG. 12 is a simplified diagram of a mutual capacitance circuit 220, in accordance with one embodiment of the present invention. The mutual capacitance circuit 220 includes a driving line 222 and a sensing line 224 that are spatially separated thereby forming a capacitive coupling node 226. The driving line 222 is electrically coupled to a voltage source 228, and the sensing line 224 is electrically coupled to a capacitive sensing circuit 230. The driving line 222 is configured to carry a current to the capacitive coupling node 226, and the sensing line 224 is configured to carry a current to the capacitive sensing circuit 230. When no object is present, the capacitive coupling at the node 226 stays fairly constant. When an object 232 such as a finger is placed proximate the node 226, the capacitive coupling changes through the node 226 changes. The object 232 effectively shunts some of the field away so that the charge projected across the node 226 is less. The change in capacitive coupling changes the current that is carried by the sensing lines 224. The capacitive sensing circuit 230 notes the current change and the position of the node 226 where the current change occurred and reports this information in a raw or in some processed form to a host controller. The capacitive sensing circuit does this for each node 226 at about the same time (as viewed by a user) so as to provide multipoint sensing.

The sensing line 224 may contain a filter 236 for eliminating parasitic capacitance 237, which may for example be created by the large surface area of the row and column lines relative to the other lines and the system enclosure at ground potential. Generally speaking, the filter rejects stray capacitance effects so that a clean representation of the charge transferred across the node 226 is outputted (and not anything in addition to that). That is, the filter 236 produces an output that is not dependent on the parasitic capacitance, but rather on the capacitance at the node 226. As a result, a more accurate output is produced.

Figure 13:
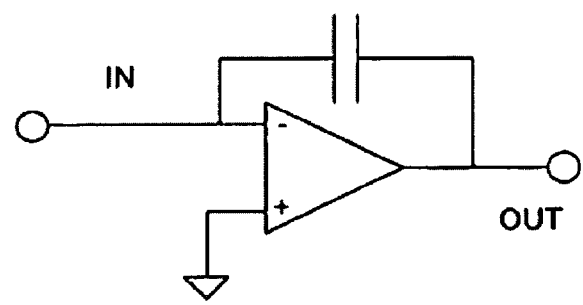
FIG. 13 is a diagram of a charge amplifier, in accordance with one embodiment of the present invention.

FIG. 13 is a diagram of an inverting amplifier 240, in accordance with one embodiment of the present invention. The inverting amplifier 240 may generally correspond to the filter 236 shown in FIG. 12. As shown, the inverting amplifier includes a non inverting input that is held at a constant voltage (in this case ground), an inverting input that is coupled to the node and an output that is coupled to the capcitive sensing circuit 230. The output is coupled back to the inverting input through a capacitor. During operation, the input from the node may be disturbed by stray capacitance effects, i.e., parasitic capacitance. If so, the inverting amplifier is configured to drive the input back to the same voltage that it had been previously before the stimulus. As such, the value of the parasitic capacitance doesn't matter.

Figure 14:
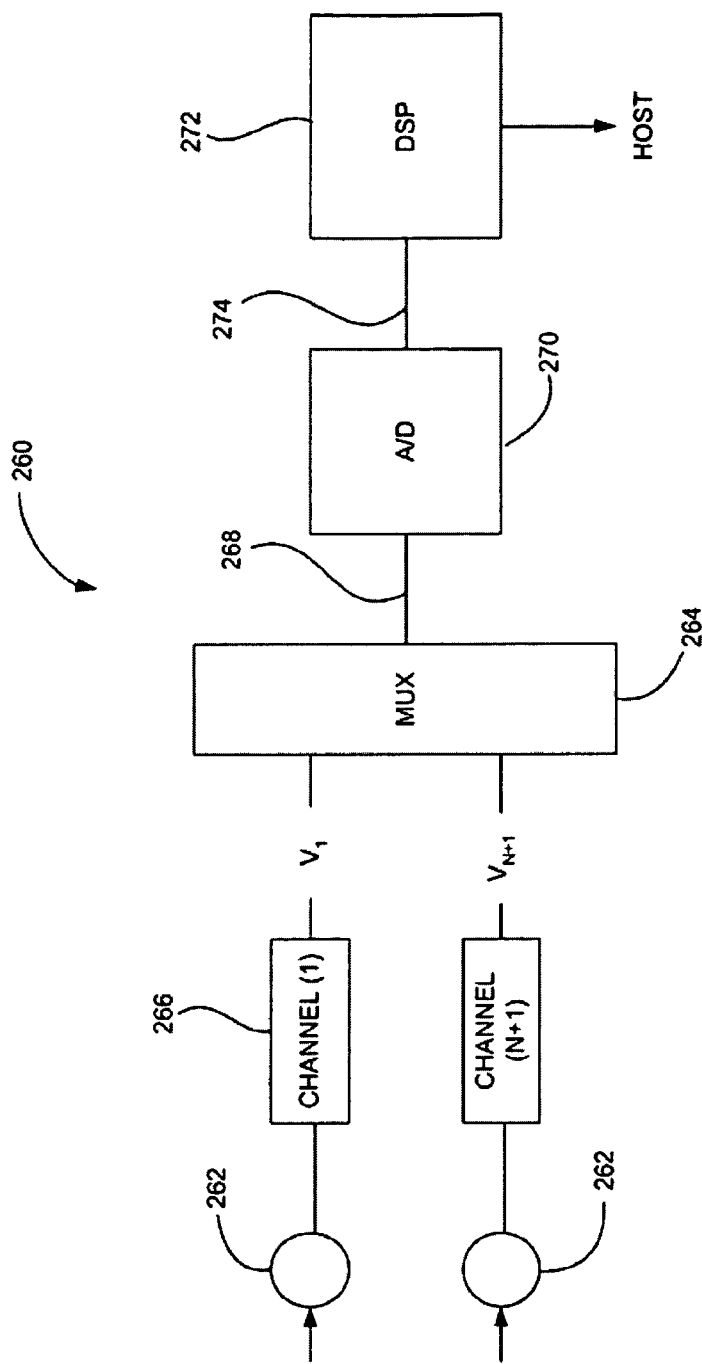
FIG. 14 is a block diagram of a capacitive sensing circuit, in accordance with one embodiment of the present invention.

FIG. 14 is a block diagram of a capacitive sensing circuit 260, in accordance with one embodiment of the present invention. The capacitive sensing circuit 260 may for example correspond to the capacitive sensing circuits described in the previous figures. The capacitive sensing circuit 260 is configured to receive input data from a plurality of sensing points 262 (electrode, nodes, etc.), to process the data and to output processed data to a host controller.

The sensing circuit 260 includes a multiplexer 264 (MUX). The multiplexer 264 is a switch configured to perform time multiplexing. As shown, the MUX 264 includes a plurality of independent input channels 266 for receiving signals from each of the sensing points 262 at the same time. The MUX 264 stores all of the incoming signals at the same time, but sequentially releases them one at a time through an output channel 268.

The sensing circuit 260 also includes an analog to digital converter 270 (ADC) operatively coupled to the MUX 264 through the output channel 268. The ADC 270 is configured to digitize the incoming analog signals sequentially one at a time. That is, the ADC 270 converts each of the incoming analog signals into outgoing digital signals. The input to the ADC 270 generally corresponds to a voltage having a theoretically infinite number of values. The voltage varies according to the amount of capacitive coupling at each of the sensing points 262. The output to the ADC 270, on the other hand, has a defined number of states. The states generally have predictable exact voltages or currents.

The sensing circuit 260 also includes a digital signal processor 272 (DSP) operatively coupled to the ADC 270 through another channel 274. The DSP 272 is a programmable computer processing unit that works to clarify or standardize the digital signals via high speed mathematical processing. The DSP 274 is capable of differentiating between human made signals, which have order, and noise, which is inherently chaotic. In most cases, the DSP performs filtering and conversion algorithms using the raw data. By way of example, the DSP may filter noise events from the raw data, calculate the touch boundaries for each touch that occurs on the touch screen at the same time, and thereafter determine the coordinates for each touch event. The coordinates of the touch events may then be reported to a host controller where they can be compared to previous coordinates of the touch events to determine what action to perform in the host device.

Figure 15:
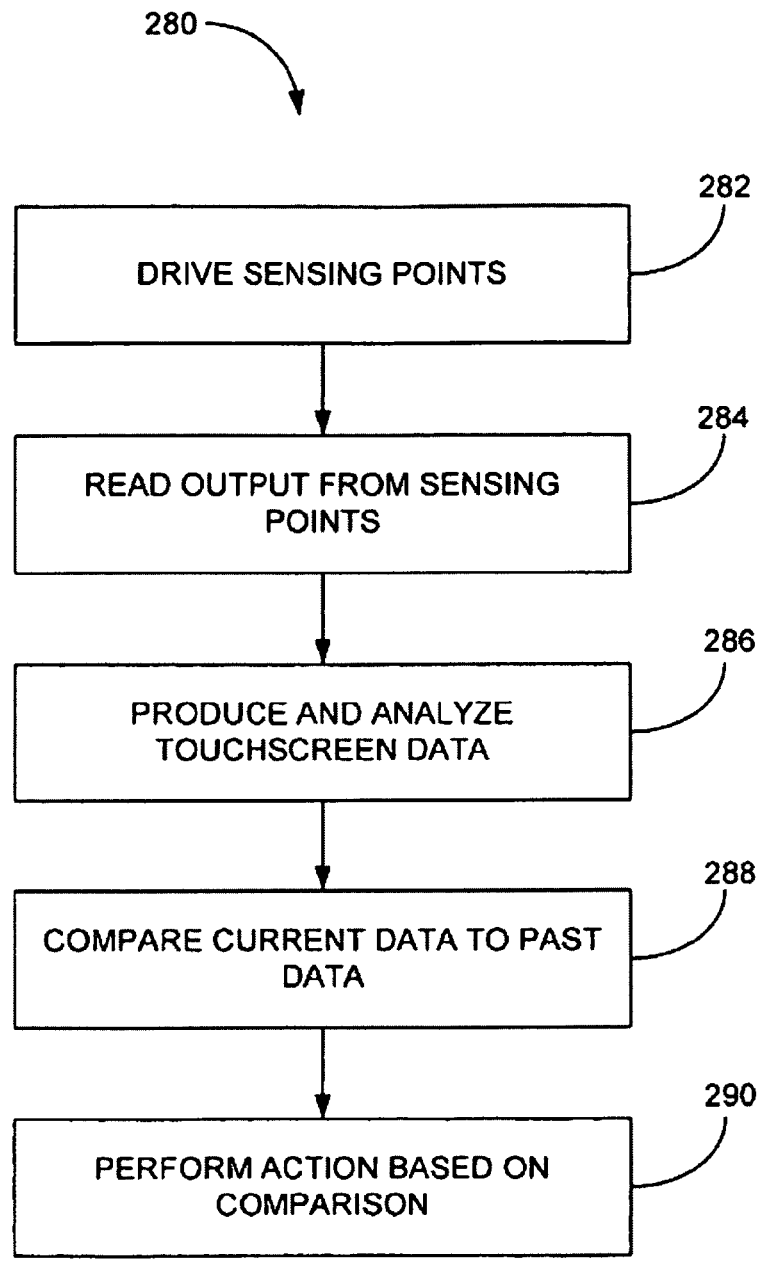
FIG. 15 is a flow diagram, in accordance with one embodiment of the present invention.

FIG. 15 is a flow diagram 280, in accordance with one embodiment of the present invention. The method generally begins at block 282 where a plurality of sensing points are driven. For example, a voltage is applied to the electrodes in self capacitance touch screens or through driving lines in mutual capacitance touch screens. In the later, each driving line is driven separately. That is, the driving lines are driven one at a time thereby building up charge on all the intersecting sensing lines. Following block 282, the process flow proceeds to block 284 where the outputs (voltage) from all the sensing points are read. This block may include multiplexing and digitizing the outputs. For example, in mutual capacitance touch screens, all the sensing points on one row are multiplexed and digitized and this is repeated until all the rows have been sampled. Following block 284, the process flow proceeds to block 286 where an image or other form of data (signal or signals) of the touch screen plane at one moment in time can be produced and thereafter analyzed to determine where the objects are touching the touch screen. By way of example, the boundaries for each unique touch can be calculated, and thereafter the coordinates thereof can be found. Following block 286, the process flow proceeds to block 288 where the current image or signal is compared to a past image or signal in order to determine a change in pressure, location, direction, speed and acceleration for each object on the plane of the touch screen. This information can be subsequently used to perform an action as for example moving a pointer or cursor or making a selection as indicated in block 290.

Figure 16:
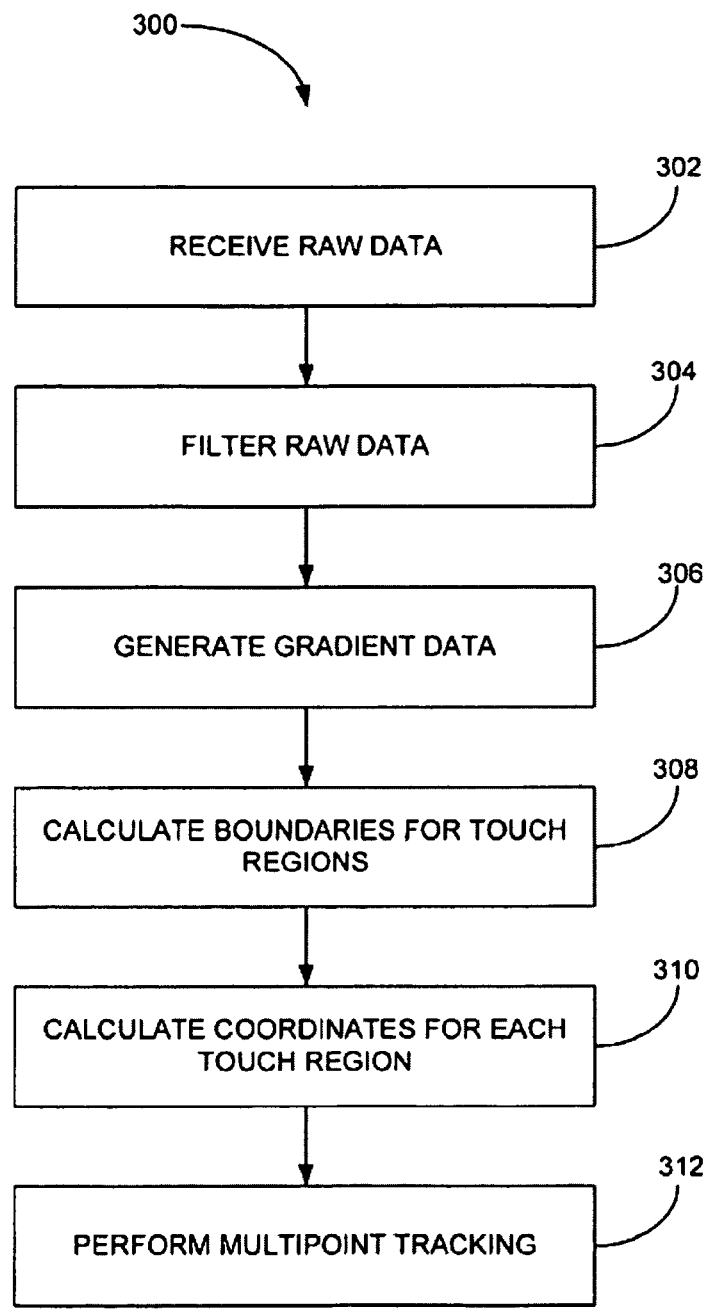
FIG. 16 is a flow diagram of a digital signal processing method, in accordance with one embodiment of the present invention.

FIG. 16 is a flow diagram of a digital signal processing method 300, in accordance with one embodiment of the present invention. By way of example, the method may generally correspond to block 286 shown and described in FIG. 15. The method 300 generally begins at block 302 where the raw data is received. The raw data is typically in a digitized form, and includes values for each node of the touch screen. The values may be between 0 and 256 where 0 equates to the highest capacitive coupling (no touch pressure) and 256 equates to the least capacitive coupling (full touch pressure). An example of raw data at one point in time is shown in FIG. 17A. As shown in FIG. 17A, the values for each point are provided in gray scale where points with the least capacitive coupling are shown in white and the points with the highest capacitive coupling are shown in black and the points found between the least and the highest capacitive coupling are shown in gray.

Following block 302, the process flow proceeds to block 304 where the raw data is filtered. As should be appreciated, the raw data typically includes some noise. The filtering process is configured to reduce the noise. By way of example, a noise algorithm may be run that removes points that aren't connected to other points. Single or unconnected points generally indicate noise while multiple connected points generally indicate one or more touch regions, which are regions of the touch screen that are touched by objects. An example of a filtered data is shown in FIG. 17B. As shown, the single scattered points have been removed thereby leaving several concentrated areas.

Following block 304, the process flow proceeds to block 306 where gradient data is generated. The gradient data indicates the topology of each group of connected points. The topology is typically based on the capacitive values for each point. Points with the lowest values are steep while points with the highest values are shallow. As should be appreciated, steep points indicate touch points that occurred with greater pressure while shallow points indicate touch points that occurred with lower pressure. An example of gradient data is shown in FIG. 17C.

Following block 306, the process flow proceeds to block 308 where the boundaries for touch regions are calculated based on the gradient data. In general, a determination is made as to which points are grouped together to form each touch region. An example of the touch regions is shown in FIG. 17D.

In one embodiment, the boundaries are determined using a watershed algorithm. Generally speaking, the algorithm performs image segmentation, which is the partitioning of an image into distinct regions as for example the touch regions of multiple objects in contact with the touch screen. The concept of watershed initially comes from the area of geography and more particularly topography where a drop of water falling on a relief follows a descending path and eventually reaches a minimum, and where the watersheds are the divide lines of the domains of attracting drops of water. Herein, the watershed lines represent the location of pixels, which best separate different objects touching the touch screen. Watershed algorithms can be widely varied. In one particular implementation, the watershed algorithm includes forming paths from low points to a peak (based on the magnitude of each point), classifying the peak as an ID label for a particular touch region, associating each point (pixel) on the path with the peak. These steps are performed over the entire image map thus carving out the touch regions associated with each object in contact with the touch screen.

Following block 308, the process flow proceeds to block 310 where the coordinates for each of the touch regions are calculated. This may be accomplished by performing a centroid calculation with the raw data associated with each touch region. For example, once the touch regions are determined, the raw data associated therewith may be used to calculate the centroid of the touch region. The centroid may indicate the central coordinate of the touch region. By way of example, the X and Y centroids may be found using the following equations: $Xc = \Sigma Z \cdot x / \Sigma Z$; and $Yc = \Sigma Z \cdot y / \Sigma Z$, where Xc represents the x centroid of the touch region Yc represents the y centroid of the touch region x represents the x coordinate of each pixel or point in the touch region y represents the y coordinate of each pixel or point in the touch region Z represents the magnitude (capacitance value) at each pixel or point.

An example of a centroid calculation for the touch regions is shown in FIG. 17E. As shown, each touch region represents a distinct x and y coordinate. These coordinates may be used to perform multipoint tracking as indicated in block 312. For example, the coordinates for each of the touch regions may be compared with previous coordinates of the touch regions to determine positioning changes of the objects touching the touch screen or whether or not touching objects have been added or subtracted or whether a particular object is being tapped.

Figure 18:
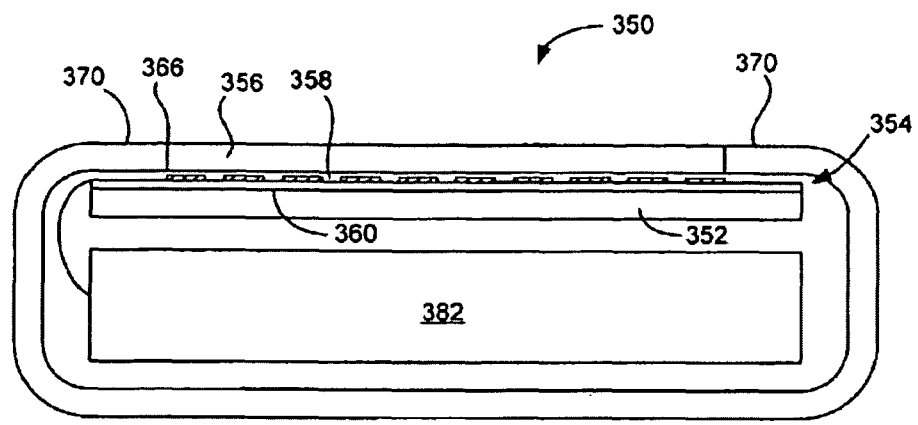
FIG. 18 is a side elevation view of an electronic device, in accordance with one embodiments of the present invention.
Figure 19:
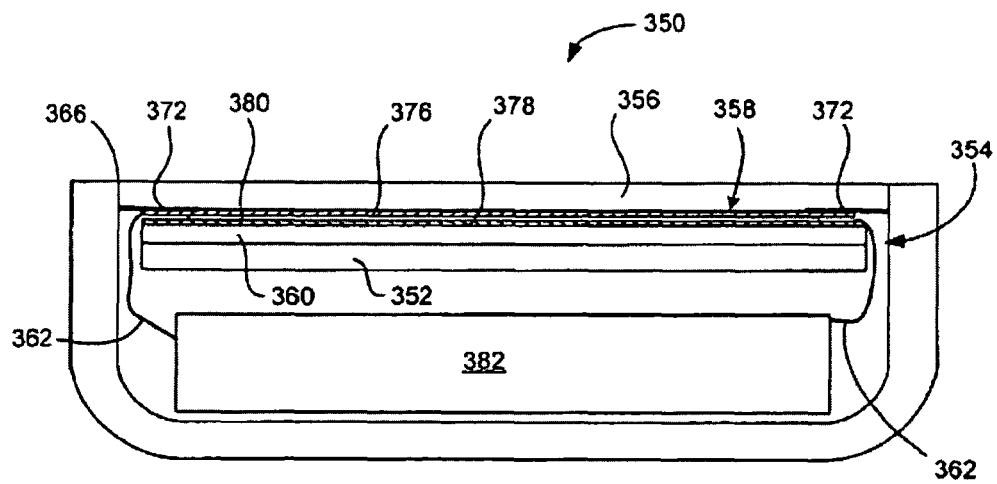
FIG. 19 is a side elevation view of an electronic device, in accordance with one embodiment of the present invention.

FIGS. 18 and 19 are side elevation views of an electronic device 350, in accordance with multiple embodiments of the present invention. The electronic device 350 includes an LCD display 352 and a transparent nanostructure-film touch screen 354 positioned over the LCD display 352. The nanostructure-film touch screen 354 includes a protective sheet 356, one or more sensing layers 358, and a bottom glass member 360. In this embodiment, the bottom glass member 360 is the front glass of the LCD display 352. Further, the sensing layers 358 may be configured for either self or mutual capacitance as described above. The sensing layers 358 generally include a plurality of interconnects at the edge of the nanostructure-film touch screen for coupling the sensing layer 358 to a sensing circuit (not shown). By way of example, the sensing layer 358 may be electrically coupled to the sensing circuit through one or more flex circuits 362, which are attached to the sides of the nanostructure-film touch screen 354.

As shown, the LCD display 352 and nanostructure-film touch screen 354 are disposed within a housing 364. The housing 364 serves to cover and support these components in their assembled position within the electronic device 350. The housing 364 provides a space for placing the LCD display 352 and nanostructure-film touch screen 354 as well as an opening 366 so that the display screen can be seen through the housing 364. In one embodiment, as shown in FIG. 18, the housing 364 includes a facade 370 for covering the sides the LCD display 352 and nanostructure-film touch screen 354. Although not shown in great detail, the facade 370 is positioned around the entire perimeter of the LCD display 352 and nanostructure-film touch screen 354. The facade 370 serves to hide the interconnects leaving only the active area of the LCD display 352 and nanostructure-film touch screen 354 in view.

In another embodiment, as shown in FIG. 19, the housing 364 does not include a facade 370, but rather a mask 372 that is printed on interior portion of the top glass 374 of the nanostructure-film touch screen 354 that extends between the sides of the housing 364. This particular arrangement makes the mask 372 look submerged in the top glass 356. The mask 372 serves the same function as the facade 370, but is a more elegant solution. In one implementation, the mask 372 is a formed from high temperature black polymer. In the illustrated embodiment of FIG. 19, the nanostructure-film touch screen 354 is based on mutual capacitance sensing and thus the sensing layer 358 includes driving lines 376 and sensing lines 378. The driving lines 376 are disposed on the top glass 356 and the mask 372, and the sensing lines 378 are disposed on the bottom glass 360. The driving lines and sensing lines 376 and 378 are insulated from one another via a spacer 380. The spacer 380 may for example be a clear piece of plastic with optical matching materials retained therein or applied thereto.

In one embodiment and referring to both FIGS. 18 and 19, the electronic device 350 corresponds to a tablet computer. In this embodiment, the housing 364 also encloses various integrated circuit chips and other circuitry 382 that provide computing operations for the tablet computer. By way of example, the integrated circuit chips and other circuitry may include a microprocessor, motherboard, Read-Only Memory (ROM), Random-Access Memory (RAM), a hard drive, a disk drive, a battery, and various input/output support devices.

Figure 20:
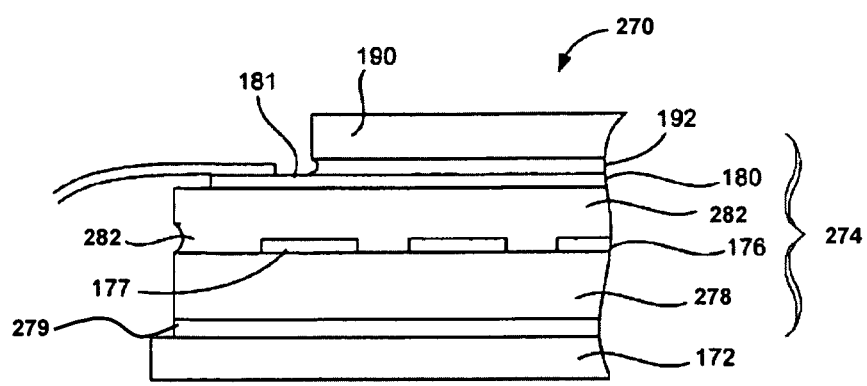
FIG. 20 is a partial front elevation view, in cross section of a display arrangement, in accordance with one embodiment of the present invention.

FIG. 20 is a partial front elevation view, in cross section of a display arrangement 270, in accordance with another embodiment of the present invention. The display arrangement 270 includes an LCD display 172 and a nanostructure-film touch screen 274 positioned over the LCD display 170. The nanostructure-film touch screen may for example correspond to the nanostructure-film touch screen shown in FIG. 9. The LCD display 172 may correspond to any conventional LCD display known in the art. Although not shown, the LCD display 172 typically includes various layers including a fluorescent panel, polarizing filters, a layer of liquid crystal cells, a color filter and the like.

The nanostructure-film touch screen 274 includes a transparent sensing layer 176 that is positioned over a substrate 278. The sensing layer 176 includes a plurality of sensor lines 177 positioned in columns (extend in and out of the page). The substrate 278 may comprise glass, as in previous examples, and/or other transparent materials such as polyethylene terephthalate (PET), polyethylene naphthalate (PEN), polycarbonate (PC), polyethersulfone (PES) and/or Arton. Flexible substrates may be advantageous in that they are compatible with roll-to-roll processing (e.g., nanostructure film coating and/or patterning). As compared to a batch process, which handles only one component at a time, a roll-to-roll process represents a dramatic deviation from current manufacturing practices, and can reduce capital equipment and device part costs, while significantly increasing throughput.

In addition to sensor layer 176, shielding layer 279 may be coated onto substrate 278 (e.g., a common substrate). Shielding layer 279 may be optically transparent and electrically conductive, so as to at least partially shield touch screen 274 from electric field(s) emanating from LCD 172. Both sensor layer 176 and shielding layer 279 may comprise nanostructure films. These layers may be coated onto substrate 278 separately and/or simultaneously (e.g., by dip-coating).

The nanostructure-film touch screen 274 also includes a transparent driving layer 180. This layer may be positioned over a dielectric layer 282 deposited over sensor layer 176. The sensing layer 176 is therefore sandwiched between the substrate 278 and dielectric layer 282. Dielectric layer 282 provides an insulating layer between the driving and sensing layers 176 and 180, and may comprise, for example, an epoxy or heat/UV-curable polymer such as poly(4-vinyl phenol). As in previous embodiments, the driving layer 180 includes a plurality of driving lines 181 positioned in rows (extend to the right and left of the page). The driving lines 181 are configured to intersect or cross the sensing lines 177 positioned in columns in order to form a plurality of capacitive coupling nodes 182. Like the sensing layer 176, the driving layer 180 may comprise a nanostructure film, and may be coated using suitable materials and patterning techniques.

The nanostructure-film touch screen 174 may also include a protective cover sheet 190 disposed over the driving layer 180. The driving layer 180 is therefore sandwiched between dielectric layer 282 and the protective cover sheet 190. The protective cover sheet 190 serves to protect the under layers and provide a surface for allowing an object to slide thereon. The protective cover sheet 190 also provides an insulating layer between the object and the driving layer 180. The protective cover sheet is suitably thin to allow for sufficient coupling. The protective cover sheet 190 may be formed from any suitable clear material such as glass and plastic. In addition, the protective cover sheet 190 may be treated with coatings to reduce sticktion when touching and reduce glare when viewing the underlying LCD display 172. By way of example, a low sticktion/anti reflective coating may be applied over the cover sheet 190. Although the line layer is typically patterned on a glass member, it should be noted that in some cases it may be alternatively or additionally patterned on the protective cover sheet.

Protective cover sheet 190 may be attached to touch screen 274 by bonding layer 192. The bonding layers 192, substrate 278 and protective cover sheet 190 may together form a laminated structure having substantial rigidity and stiffness.

With regards to configuration, each of the various layers may be formed with various sizes, shapes, and the like.

In one exemplary embodiment, sensing and shielding layers may be coated and patterned on opposite sides of a common substrate, while a deposited insulating layer (e.g., epoxy and/or heat/UV-curable polymer) separates the sensing layer and the driving layer. For example, a common substrate may be dip-coated in a nanotube dispersion, such that transparent, conductive nanotube films (e.g., as described above) are formed on both sides of the common substrate. The film on one side of the substrate may be patterned to form a sensing layer, over which an electrically insulating material (e.g., a polymer) may be deposited to form a dielectric layer, while the film on the other side of the substrate may remain unpatterned to form a shielding layer. Another transparent, conductive nanotube film may then be formed on the dielectric layer (e.g., by a solution-based deposition, as described above), and patterned to form a driving layer. A protective cover sheet may be placed over the driving layer, e.g., attached via a bonding layer.

In one exemplary embodiment, sensing and driving layers may be coated and patterned on opposite sides of a common substrate, while a deposited insulating layer (e.g., epoxy and/or heat/UV-curable polymer) separates the sensing layer and the shielding layer. For example, a common substrate may be dip-coated in a nanotube dispersion, such that transparent, conductive nanotube films (e.g., as described above) are formed on both sides of the common substrate. The film on one side of the substrate may be patterned to form a sensing layer, over which an electrically insulating material (e.g., a polymer) may be deposited to form a first dielectric layer. Another transparent, conductive nanotube film may then be formed on the first dielectric layer (e.g., by a solution-based deposition, as described above), to form a shielding layer. The film on the other side of the substrate may be patterned to form a driving layer, over which a protective cover sheet may be placed, e.g., attached via a bonding layer.

In one exemplary embodiment, sensing and driving layers may be coated and patterned on the same side of a common substrate, and separated by a deposited insulating layer. For example, a transparent, conductive nanotube film may be deposited on one side of a common substrate (e.g., a protective cover sheet), and patterned to form a driving layer. An electrically insulating material (e.g., a polymer) may be deposited over this driving layer to form a dielectric layer. A second transparent, conductive nanotube film may be deposited over the dielectric layer, and patterned to form a sensing layer. An electrically insulating material may be deposited over this sensing layer to form a second dielectric layer, on which a third transparent, conductive nanotube film may be deposited to form a shielding layer.

While the driving layer, sensing layer and shielding layer may all comprise transparent, conductive nanotube films, such layers need not have the same optoelectronic properties. For example, it may be advantageous to make the shielding layer thinner than the driving layer and/or the sensing layer, such that the shielding layer has a higher optical transparency but a lower electrical conductivity than the driving layer and/or the sensing layer. Likewise, it may be advantageous to pattern certain layers (e.g., the driving layer and/or sensing layer), and not others (e.g., the shielding layer).

The present invention has been described above with reference to preferred features and embodiments. Those skilled in the art will recognize, however, that changes and modifications may be made in these preferred embodiments without departing from the scope of the present invention.

What is claimed is:

1. A touch screen, comprising:
  a sensing layer;
  a driving layer;
  a substrate, and
  a shielding layer configured to shield the touch screen from an electric field,
  wherein the touch screen can detect multiple touches or near touches that occur at the same time and at distinct locations in a plane of the touch screen and produce distinct signals representative of the location of the touches on the plane of the touch screen for each of the multiple touches,
  wherein at least one of the sensing layer and the driving layer comprises a first nanostructure film,
  wherein the first nanostructure film is optically transparent and electrically conductive,
  wherein the sensing layer and the driving layer are separated by a first insulating layer, and
  wherein the sensing layer and the shielding layer are positioned on opposite sides of the substrate,
  wherein the shielding layer comprises a second nanostructure film, and
  wherein the second nanostructure film is optically transparent and electrically conductive.

2. The touch screen of claim 1, wherein the sensing layer and the driving layer are formed on the substrate.

3. The touch screen of claim 2, wherein the first and second nanostructure films each comprise at least one interconnected network of nanotubes.

4. The touch screen of claim 3, wherein the first and second nanostructure films are formed on opposite sides of the substrate.

5. The touch screen of claim 1, wherein the first nanostructure film comprises at least one interconnected network of nanotubes.

6. The touch screen of claim 1, further comprising:
  a LCD coupled to the shielding layer, wherein the LCD and the sensing layer are separated by the shielding layer and the substrate.

7. The touch screen of claim 1, wherein
  the sensing layer is on the substrate,
  the first insulating layer is on the sensing layer, and
  the driving layer is on the first insulating layer.

8. A method of forming a touch screen, comprising:
  depositing a sensing layer and a driving layer on a first side of a substrate; and
  depositing a shielding layer on a second side of the substrate,
  wherein the shielding layer and the sensing layer are deposited on opposite sides of the substrate simultaneously,
  wherein the touch screen can detect multiple touches or near touches that occur at the same time and at distinct locations in the plane of the touch screen and produce distinct signals representative of the location of the touches on the plane of the touch screen for each of the multiple touches,
  wherein the shielding layer comprises a nanostructure film, and
  wherein the nanostructure film is optically transparent and electrically conductive.

9. The method of claim 8, further comprising:
  depositing an insulating layer over at least one of the sensing layer, the driving layer and the shielding layer.

10. The method of claim 9, wherein the insulating layer and the nanostructure film are deposited using solution-based deposition methods.

11. The method of claim 10, wherein at least two of the sensing layer, the driving layer and the shielding layer comprise nanostructure films.

12. A method of forming a touch screen, comprising:
  forming a sensing layer and a shielding layer on opposite sides of a substrate,
    the shielding layer being configured to shield the touch screen from an electric field,
    wherein the touch screen can detect multiple touches or near touches that occur at the same time and at distinct locations in a plane of the touch screen and produce distinct signals representative of the location of the touches on the plane of the touch screen for each of the multiple touches;
  forming an insulating layer on the sensing layer;
  forming a driving layer on the insulating layer, wherein
    at least one of the sensing layer and the driving layer include a first nanostructure film,
    the first nanostructure film is optically transparent and electrically conductive,
    the shielding layer comprises a second nanostructure film, and the second nanostructure film is optically transparent and electrically conductive.

13. The method of claim 12, wherein the first and second nanostructure films each comprises at least one interconnected network of nanotubes.

14. The method of claim 12, further comprising:
coupling a LCD to the shielding layer, wherein the LCD and the sensing layer are separated by the shielding layer and the substrate.

* * * * *